United States Patent
Henry et al.

(10) Patent No.: US 11,669,586 B2
(45) Date of Patent: Jun. 6, 2023

(54) SYSTEMS AND METHODS FOR COMBINING LOW-MANTISSA UNITS TO ACHIEVE AND EXCEED FP64 EMULATION OF MATRIX MULTIPLICATION

(71) Applicant: Intel Corporation, Santa Clara, CA (US)

(72) Inventors: Gregory Henry, Hillsboro, OR (US); Alexander Heinecke, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/680,483

(22) Filed: Feb. 25, 2022

(65) Prior Publication Data

US 2022/0391470 A1    Dec. 8, 2022

Related U.S. Application Data

(63) Continuation of application No. 16/913,911, filed on Jun. 26, 2020, now Pat. No. 11,263,291.

(51) Int. Cl.
*G06F 17/16* (2006.01)
*G06F 9/455* (2018.01)
*G06F 9/30* (2018.01)

(52) U.S. Cl.
CPC ............ *G06F 17/16* (2013.01); *G06F 9/3001* (2013.01); *G06F 9/3016* (2013.01); *G06F 9/45508* (2013.01)

(58) Field of Classification Search
None
See application file for complete search history.

(56) References Cited

U.S. PATENT DOCUMENTS 10,778,245 B1 * 9/2020 Ramesh ................. G06F 7/483
2005/0066205 A1 * 3/2005 Holmer ................. G06T 15/005
713/320

(Continued)

FOREIGN PATENT DOCUMENTS

GB         2560159 A        9/2018

OTHER PUBLICATIONS

Gok, Mustafa et al., Multi-functional floaitng-point MAF designs with dot product support, 2007, Elsevier, pp. 30-43. (Year: 2007).*

(Continued)

*Primary Examiner* — Eric Coleman
(74) *Attorney, Agent, or Firm* — Fletcher Yoder, P.C.

(57) ABSTRACT

The present disclosure relates to an apparatus that includes decoding circuitry that decodes a single instruction. The single instruction includes an identifier of a first source operand, an identifier of a second source operand, an identifier of a destination, and an opcode indicative of execution circuitry is to multiply from the identified first source operand and the identified second source operand and store a result in the identified destination. Additionally, the apparatus includes execution circuitry to execute the single decoded instruction to calculate a dot product by calculating a plurality of products using data elements of the identified first and second operands using values less precise than the identified first and second source operands, summing the calculated products, and storing the summed products in the destination.

20 Claims, 13 Drawing Sheets

(56) References Cited

U.S. PATENT DOCUMENTS

| | | |
|---|---|---|
| 2007/0186082 A1* | 8/2007 | Prokopenko .......... G06F 9/3885 |
| | | 712/221 |
| 2008/0071851 A1 | 3/2008 | Zohar et al. |
| 2014/0195783 A1 | 7/2014 | Karthikeyan et al. |
| 2019/0042235 A1* | 2/2019 | Sade ....................... G06F 9/383 |
| 2019/0079767 A1 | 3/2019 | Heinecke et al. |
| 2019/0179635 A1 | 6/2019 | Jiao et al. |
| 2019/0324746 A1 | 10/2019 | Maiyuran et al. |
| 2019/0377573 A1 | 12/2019 | Magklis et al. |
| 2020/0210838 A1* | 7/2020 | Lo .......................... G06N 20/00 |

OTHER PUBLICATIONS

Ning, Q. et al., Scalable Image Retrieval by Sparse Product Quantization, 2017, IEEE. pp. 506-597. (Year: 2017).*
Grutzmacher, T. et al., A Modular Precision Format for Decoupling Arithmetic Format and Storage Format, 2018, Springer, Euro-Par 2018 Parallel processing Workshops, LNCS 11339, pp. 434-443. (Year: 2018).*
Johansson, F. et al., "Faster arbitrary-precision dot product and matrix multiplication", 2019, IEEE, pp. 15-22. (Year: 2019).
Yun, S. et al., "A Low Complexity Floating-Point Complex Multiplier with a Three-Term Dot-Product Unit", IEEE, 2014, pp. 549-552. (Year: 2014).
Saleh, H. H,. et al., "A Floating-Point Fused Dot-Product Unit", IEEE, 2008, pp. 427-431. (Year: 2008).
Gok, M. et al., "Multi-functional floating-point MAF designs with dot product support", 2008, Elsevier, Microelectronics Journal 39, pp. 30-43., (Year: 2008).

* cited by examiner

SYSTEMS AND METHODS FOR COMBINING LOW-MANTISSA UNITS TO ACHIEVE AND EXCEED FP64 EMULATION OF MATRIX MULTIPLICATION

CROSS-REFERENCE TO RELATED APPLICATIONS

This application is a continuation of U.S. patent application Ser. No. 16/913,911, entitled "Systems and Methods for Combining Low-Mantissa Units to Achieve and Exceed FP64 Emulation of Matrix Multiplication," filed on Jun. 26, 2020, which is incorporated by reference herein in its entirety for all purposes.

BACKGROUND

This disclosure relates to the control of processors, and, more specifically, relates to techniques that enable features to be opted into and out of in portions of a processor that are capable of providing different features.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

A processor may execute instructions to perform various operations, such as to multiply matrices. For example, a processor may include circuitry that is utilized to calculate the product of two matrices that include floating-point values. In some cases, such as when multiplication operations associated with double-precision data (e.g., floating-point values each defined by 64 bits of a data), undesirably large amounts of circuitry included in processors may be used to carry out these operations. Moreover, due to the size of the data, an undesirable amount of time or number of determinations may be used in order to determine products of matrices that are multiplied by one another. Accordingly, performing multiplication of matrices that reduces the amount of circuitry used to perform such operations, reduces the amount of time utilized to perform such operations, or reduces the number of determinations a processor makes in order to perform such operations may improve the efficiency of processors.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
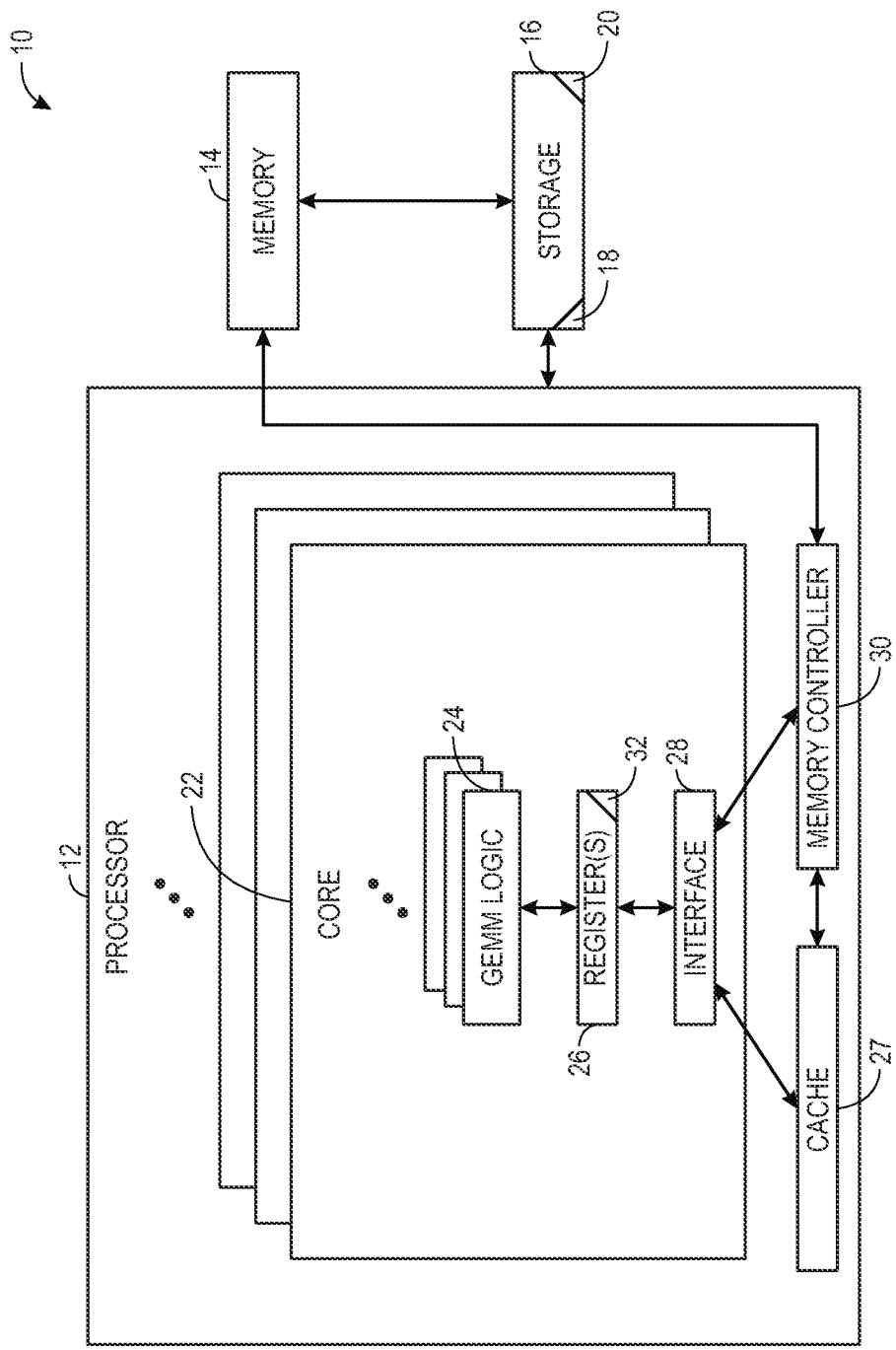
FIG. 1 is a block diagram of a system that includes a processor that can perform matrix multiplication operations, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

A processor (e.g., having one or more cores) may execute instructions (e.g., a thread of instructions (software thread)) to operate on data, for example, to perform arithmetic, logic, or other functions. For example, software may request an operation to be performed, and a hardware processor (e.g., one or more cores thereof) may perform the operation in response to the request. In certain embodiments, multiple operations are accomplished with the execution of a single instruction. In one embodiment, a logical processing element (e.g., a core) of a processor is to execute each thread of instructions. It should be noted that the term "instruction" herein may refer to a macro-instruction (e.g., an instruction that is provided to the processor for execution) or to a micro-instruction (e.g., an instruction that results from a processor's decoder decoding macro-instructions).

As an example, a processor may execute instructions to multiply two matrices. For instance, matrices may include floating-point numbers. Generally, a floating-point number is a number that can be written as a mantissa (also known as a significand) multiplied by a base that is raised to a particular exponent value. For example, the value 1017 can be represented in floating-point number format by $1.017 \times 10^3$, in which case "1.017" is the mantissa, "10" is the base, and "3" is the exponent. In the case of binary floating numbers, the base is "2."

Floating-numbers can be represented in a variety of formats that each include a certain number of bits that are used to represent the mantissa, exponent, and a sign (e.g., positive or negative) of the exponent. One such format can generally be called double-precision floating-point format in which 64 bits are utilized to define numerical values. More information regarding the double-precision format (and other formats), may be found in the Institute of Electrical and Electronics Engineers ("IEEE") Standard No. 754, entitled "IEEE Standard for Floating-point Arithmetic." For example, double-precision floating-point value may include one sign bit, eleven exponent bits, and fifty-two (explicit) significand bits in which the base is two. More specifically, the mantissa may have fifty-three bits in total, with fifty-two of the bits being explicitly stored and one of the bits having an implied value (e.g., a "1"). This format can also be referred to as a binary64 format or FP64 format.

As discussed below, a processor may include circuitry that is utilized to perform floating-point mathematical operations, such as multiplying matrices that include floating-point numbers. For example, software instructions being executed by the processor may request that matrix multiplication involving double-precision floating-point numbers be performed. One way of performing the requested multiplication operation could involve utilizing a routine (e.g., defined by instructions and/or supported by an instruction set architecture) such as double-precision general matrix-matrix multiplication, or "DGEMM" for short. As described in more detail below, performing matrix multiplication using DGEMM may utilize relatively large amounts of the processor, thereby keeping the processor from utilizing processing power for other purposes. Additionally, using generally large amount of processing resources to perform multiplication operations may cause the multiplication operations to be power-constrained, which may additionally limit or reduce the processor's performance. The techniques described below enable processors to more efficiently determine products of matrices that include double-precision floating-point values, for instance, by utilizing less hardware of the processor compared to using DGEMM. For example, matrices with double-precision floating-point values may be divided (e.g., into lower precision floating-point values), the divided values are multiplied together, and a sum of the multiplied values is determined, thereby giving a value for a product of the two matrices having the double-precision floating-point values. Accordingly, the techniques described herein enable processors to emulate performing a DGEMM routine to determine the product of matrices having double-precision floating-point values in a manner more efficient than performing the DGEMM routine.

Keeping the foregoing in mind, FIG. 1 illustrates a system 10 that includes a processor 12, memory 14, and storage device 16. As depicted, the processor 12 is communicatively coupled to the memory 14 and the storage device 16. The processor 12 may be various types of processors, such as, but not limited to a microprocessor, a digital signal processor (DSP), a microcontroller, application specific integrated circuits (ASICs), or programmable logic devices such as field-programmable gate arrays (FPGAs).

The processor 12 may execute programs or instructions stored on a suitable article of manufacture, such as the memory 14 and/or the storage device 16. For example, the storage device 16 may include DGEMM instructions 18 and one or more applications 20, both of which may be executed by the processor 12 to perform various functions. In addition to instructions for the processor 12, the memory 14 and/or the storage device 16 may also store data to be processed by the processor 12. By way of example, the memory 14 may include random access memory (RAM) and the storage device 16 may include read only memory (ROM), rewritable non-volatile memory such as flash memory, hard drives, optical discs, or the like.

The applications 20 include programs or applications that the processor 12 executes. For example, the applications 20 may be software that a user can use to perform various tasks. In some cases, the applications 20 may call for matrix math operations, such as multiplication, to be performed. The DGEMM instructions 18 may be executed by the processor 12 to perform matrix multiplication operations, or, more specifically, matrix multiplication involving double-precision floating-point values. While matrix multiplication operations are discussed in more detail below, it should be noted that the presently disclosed techniques generally include utilizing circuitry associated with relatively lower precision data types to multiply matrices that include double-precision floating-point values. As used herein, a "lower precision" data type generally refers to a data type that has a mantissa that includes fewer bits than the mantissa of another data type. Accordingly, as discussed below, circuitry that can be used to perform mathematical operations on floating-point data types that are less precise than double-precision floating-point may be utilized to perform matrix multiplication that involves double-precision floating-point values. In other words, the DGEMM instructions 18 enable a processor (e.g., processor 12) to multiply matrices having double-precision floating-points values by using circuitry associated with lower precision data types in lieu of using circuitry typically used to perform double-precision floating-point operations.

Before proceeding to discuss these techniques in more detail, it should be noted that, in addition to being stored on the storage device 16, the DGEMM instructions 18 may be stored on other embodiments of the system 10, such as the memory 14 or the processor 12. In some embodiments, the DGEMM instructions 18 may be included as part of an instruction set architecture included on the processor 12

(e.g., stored in memory of the processor 12). When the processor 12 receives a request to perform matrix multiplication operations (e.g., matrix multiplication involving double-precision floating-point values) the instruction set architecture enables the processor 12 to perform the requested matrix multiplication operations.

The processor 12 may include one or more cores 22 (e.g., a first processing element, a second processing element, and an $n^{th}$ processing element, where n is an integer greater than two). For example, in embodiments in which the processor 12 is a quad-core processor, the processor 12 includes four cores 22.

As illustrated, the cores 22 may include general matrix-matrix multiplication ("GEMM") logic 24, which is circuitry that can be utilized to perform matrix multiplication operations. The GEMM logic 24 determines the product of two matrices the GEMM logic 24 multiplies. In other words, the GEMM logic 24 is circuitry (e.g., one or more floating-point units) that can be utilized to execute the DGEMM instructions 18 in order to perform the matrix multiplication techniques discussed herein. Each GEMM logic 24 may be used to perform matrix multiplication involving different types or formats of data. For example, the cores 22 may include GEMM logic 24 that can be utilized to multiply FP64 values as well as the lower precision data types discussed below. In some embodiments, there may be multiple pieces of GEMM logic 24 for each data type. That is, there may be multiple pieces of circuitry that can perform matrix multiplication operations involving FP64 values or any other type of floating-point value discussed herein.

In addition to the cores 22 and GEMM logic 24, the processor 12 may include other circuitry, such as register(s) 26, one or more caches 27, an interface 28, and a memory controller 30. The registers 26 and caches 27 may respectively include one or more registers or caches that the processor 12 uses to locally store various types of data, such as values calculated while performing matrix multiplication and instructions (e.g., instructions to perform matrix multiplication). For instance, the registers 26 may include an accumulator 32, which is a register to which the cores 22 may provide the results of determinations made by the cores 22. More specifically, the cores 22 may provide the results of calculations made while determining the product of two matrices may be provided to the accumulator 32. Additionally, the accumulator 32 may be utilized when addition operations are performed on values generated from multiplying matrices (e.g., partial products). For example, the GEMM logic 24 may receive values from the accumulator 32 and add the values when determining a product of two matrices. The accumulator 32 may be a FP64 accumulator, meaning the accumulator 32 may store double-precision floating-point values.

The processor 12 may utilize the interface 28 to communicate with other components included in the system 10, such as the memory 14 and the storage device 16. That is, the interface 28 enables processor 12 to receive instructions or data from the storage device 16 and memory 14 as well as to provide data to the storage device 16 and memory 14. Furthermore, the memory controller may manage the flow of data to and from the processor 12.

Figure 2:
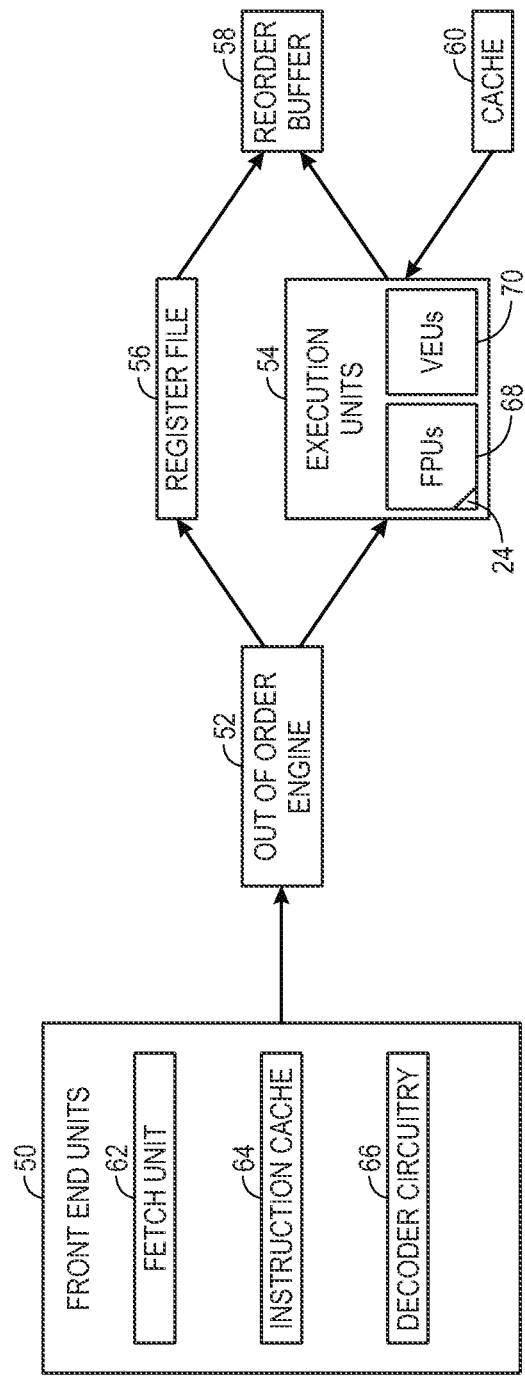
FIG. 2 is a block diagram of illustrating circuitry that may be included in the processor of FIG. 1, in accordance with an embodiment.

To help provide more context regarding circuitry that may be included in the processor 12 as well as how the processor 12 may perform matrix multiplication operations, FIG. 2 illustrates components that may be included in each of the cores 22 of the processor 12. As illustrated, the components may include front end units 50, an out of order engine 52, execution units 54, a register file 56, a reorder buffer 58, and a cache 60. It should be noted that each core 22 may include one or more of each of these components.

The front end unit 50 may include a fetch unit 62, an instruction cache 64, and decoder circuitry 66. The front end units 50 may obtain instructions (e.g., from software) and prepare the instructions for execution by the processor 12. More specifically, the fetch unit 62 may fetch instructions, such as macro-instructions from the memory 14 or instruction cache 64. Additionally, the fetch unit 62 may provide the instructions to the decoder circuitry 66, which may generate micro-instructions by decoding the macro instructions. In the context of the multiplication operations discussed herein, the fetch unit 62 may fetch instructions calling for matrices (e.g., matrices including double-precision floating-point values) from the memory 14, storage device 16, or instruction cache 64 to be multiplied. The fetch unit 62 can also send the instructions to the decoder circuitry 66, and the decoder circuitry 66 may decode the instructions in order to determine the operations that the processor 12 (or cores 22) will make in order to perform the multiplication operations requested in the instructions.

The front end unit 50 may provide the instructions (e.g., as decoded by the decoder circuitry 66) to the out of order engine 52. The out of order engine 52 may reorder instructions received from the front end unit 50 and allocate resources of the processor 12 to be used to execute the instructions. For example, the out of order engine 52 may allocate one or more execution units 54 to be used to execute the instructions. The out of order engine 52 may also rename registers onto locations within the register file 56.

The execution units 54 may receive instructions from the out of order engine 52 and perform operations (e.g., calculations) as called for the by the instructions. For example, the execution units 54 may include one or more floating-point units (FPUs) 68 and one or more vector execution units (VEUs) 70. The VEUs 70 may make determinations regarding vectors, and, in some cases, the VEUs may also include the GEMM logic 24 of FIG. 1. The FPUs 68 may make various determinations associated with floating-point values. For example, the FPUs 68 may include the GEMM logic 24 of FIG. 1. Accordingly, there may be one or more FPUs 68 that are specifically configured to perform operations on certain data types. For instance, one or more of the FPUs 68 may be used to perform operations (e.g., matrix-matrix multiplication, matrix-vector multiplication, and vector-vector multiplication) involving double-precision floating-points values. Other FPUs 68 may perform operations on other data types, such as the lower precision data types discussed below. The execution units 54 may also include other types of units that perform other types of operations, such as arithmetic logic units (ALUs) that can perform mathematical operations (e.g., addition, subtraction, multiplication, and division) involving integers.

The execution units 54 may provide data (e.g., results of calculations) to the reorder buffer 58, which examines data associated with instructions executed by the processor 12 and determines whether the instructions have successfully been carried out. For instance, the reorder buffer 58 may determine whether instructions can be retired and whether any exception has occurred that may prevent retirement of the instructions. Additionally, the reorder buffer or another buffer that may be included in the cores 22 may include an accumulator that can store values generated by the cores 22, such as partial products that will later be added when performing multiplication operations. Like the accumulator 32, such an accumulator may be a FP64 accumulator. The reorder buffer 58 and execution units 54 may be communicatively coupled to the cache 60, which may be used to store instructions or other data associated with operations performed by the processor 12.

Keeping this in mind, the techniques discussed below may be utilized to multiply matrices, vectors, or a matrix and a vector that include double-precision floating-point values (e.g., FP64 values). In general, to perform such multiplication operations, the double-precision floating point values are converted into lower precision data types. For example, as discussed below, one FP64 value may be split into two, three, four, five, six, or seven values of a data type that is less precise than double precision. In other words, an FP64 value may be characterized as being several values that have lower mantissas than FP64. Table 1 is provided below to show the data types discussed herein (FP64 inclusive), as well as the number of sign bits, exponent bits, explicit mantissa bits, and implicit mantissa bits associated with each of these data types. Lower precision values determined from double-precision values may be multiplied (e.g., by one or more FPUs specific to the lower precision data types), and a sum of the products of the lower precision values may be determined. The addition of the products may be done using the GEMM logic 24, adding circuitry included in the processor 12, or both. For example, the GEMM logic 24 and adding circuitry may add values stored in the accumulator 32 when determining a product. Accordingly, the product of matrices that include double-precision floating-point values can be obtained without utilizing circuitry (e.g., FPUs) that is designed to perform operations involving double-precision floating-point values.

TABLE 1

Floating-Point Data Types

| Data Type | Number of sign bits | Number of exponent bits | Number of mantissa bits (explicit) | Number of mantissa bits (implicit) |
|---|---|---|---|---|
| FP64 | 1 | 11 | 52 | 53 |
| FP32 | 1 | 8 | 23 | 24 |
| BF16 | 1 | 8 | 7 | 8 |
| FP16 | 1 | 5 | 10 | 11 |
| FP20 | 1 | 8 | 11 | 12 |
| FP25 | 1 | 11 | 13 | 14 |
| FP29 | 1 | 11 | 17 | 18 |
| FP38 | 1 | 11 | 26 | 27 |

The numerical value included in the name of each data type indicates how many bits are used to define the value. In addition to FP64, FP32 and FP16 are defined in IEEE Standard No. 754. More specifically, FP32 is also known as single-precision floating-point and binary32, while FP16 is also known as half-precision and binary16. The bfloat16 (BF16) format is a truncated version of FP32 in which the precision (i.e., number of implicit mantissa bits) is eight bits compared to twenty-four bits. BF16, FP20, FP25, FP29, and FP38 are data types that are not defined by IEEE Standard No. 754. Furthermore, it should be noted that the techniques discussed herein are not limited to the data types provided in Table 1. In other words, in other embodiments, data types other than those listed in Table 1 may be utilized.

As discussed below, by converting double-precision values into several lower precision values, the processor 12 may be able to utilize less area of the processor 12 to perform multiplication involving double precision values. Moreover, the processor 12 may also determine products of double-precision values more quickly using these techniques compared to when multiplying unconverted double-precision values. Accordingly, by performing several operations involving lower precision values, the processor 12 may determine the products of matrices (and vectors) that include double-precision values more quickly and using fewer resources of the processor 12 relative to using circuitry (e.g., a FPU) of the processor 12 to multiply two double-precision values without converting them into lower precision data types.

Figure 3:
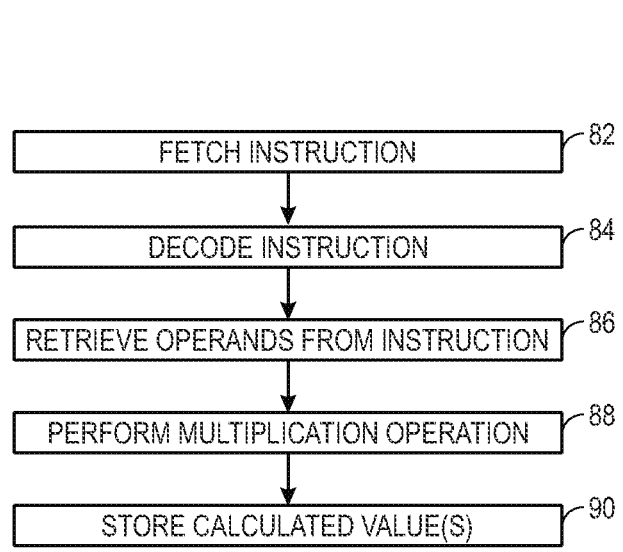
FIG. 3 is a flow diagram of a process for performing matrix multiplication involving double-precision floating-point values, in accordance with an embodiment.

Keeping the foregoing in mind, FIG. 3 is a flow chart of a process 80 for performing multiplication, such as matrix multiplication operations involving double-precision floating-point values. More particularly, the processor 12 may perform the process 80 to carry out vector-vector multiplication, matrix-matrix multiplication, or matrix-vector multiplication) on one-dimension and two-dimensional arrays having double-precision floating-point values as inputs. The process 80 generally includes fetching an instruction (process block 82), decoding the instruction (process block 84), retrieving operands from the instruction (process block 86), multiplying the operands (process block 88), and storing the value(s) calculated as a result of multiplying the operands (process block 90).

At process block 82, the processor 12 fetches an instruction. For example, as described above, the front end units 50 of the processor 12 may obtain instructions (e.g., from software) and prepare the instruction for execution by the processor 12. More specifically, the fetch unit 62 may fetch from the memory 14 or the instruction cache 64. The instruction may include several identifiers and an operation code (opcode). The identifiers may include an identifier that identifies a first source operand (e.g., value to be multiplied), an identifier than identifies a second source operation (e.g., a second value to be multiplied by the first operand), and an identifier than identifies a location where a calculated result (e.g., from multiplying the first and second operands) is to be stored (e.g., an address of the memory 14). The opcode may indicate that the processor 12 is to multiply the first source operand and the identified second source operand and store the calculated result in the identified location.

At process block 84, the processor 12 decodes the instruction. More specifically, the decoder circuitry 66 may decode the instruction in order to determine the operands and location identified by the identifiers as well as the operations that the processor 12 (or cores 22) will make in order to perform the multiplication operations, as indicated by the opcode.

At process block 86, the processor 12 retrieves the identified operands. For example, the processor 12 may retrieve the operands from the memory 14 or storage device 16. More specifically, the identifiers may indicate an address of the memory 14 or storage device 16. Thus, the processor 12 may retrieve the operands that are to be multiplied from the indicated addresses within the memory 14 or storage 16. The operands may include one or more double-precision floating-point values.

At process block 88, the processor 12 performs a multiplication operation involving the retrieved operands. In other words, the processor 12 multiplies the operands indicated by the instruction. More specifically, the front end unit 50 may provide the instruction (e.g., as decoded by the decoder circuitry 66) to the out of order engine 52. The out of order engine 52 may reorder instruction allocate resources of the processor 12 to be used to execute the instructions. For instance, the out of order engine 52 may allocate one or more FPUs 68 or VEUs 70 of the execution units 54, and the allocated FPUs 68 or VEUs 70 may multiply the operands.

At process block 90, the processor 12 stores the value(s) determined at process block 88 in the location indicated by the identifier included in the instruction. That is, the process 12 may store the calculated value(s) in the memory 14 or storage device 16 at an address indicated by the instruction.

Figure 4:
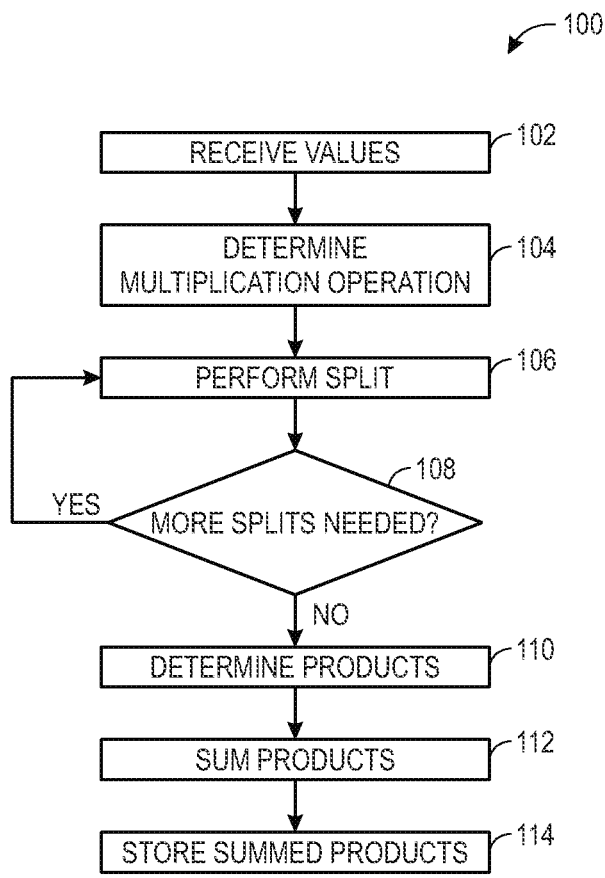
FIG. 4 is a flow diagram of a process for performing matrix multiplication involving double-precision floating-point values, in accordance with an embodiment.

Continuing with the drawings, FIG. 4 is a flow chart of a process 100 for multiplying matrices that include floating-point values, such as double-precision floating-point values. The process 100 describes certain operations of the process 80 in more detail. More specifically, the process 100 may be utilized to perform linear functions (e.g., vector-vector multiplication, matrix-matrix multiplication, or matrix-vector multiplication) on one-dimension and two-dimensional arrays having double-precision floating-point values as inputs. The process 100 may be performed by the processor 12 by executing instructions stored on the memory 14 of the storage device 16, such as the DGEMM instructions 18 and the application 20. More specifically, the process 100 may be performed by the processor 12 as well as hardware components of the processor 12 (e.g., cores 22) and the system 10 (e.g., memory 14). For example, the GEMM logic 24 can perform the process 100 in combination with other components of the cores 22, such as, but not limited to, the front-end units 50, out of order engine 52, FPUs 68, and the VEUs 70. Additionally, the process 100 or portions thereof may be performed while an instruction is being decoded, operands are retrieved, operands are multiplied, calculated values are stored, or a combination thereof.

The process 100 may be used to determine products (e.g., dot products or cross products) of double-precision floating-point values (e.g., multiplication between matrices, vectors, or a matrix and a vector). Generally, the process 100 includes converting double-precision floating-point values into lower precision values, performing multiplication operations using the lower precision values, and summing the products of the multiplication operations to obtain a double-precision floating-point value that is the product of the original inputs. More specifically, the process 100 includes receiving values (process block 102), determining a multiplication operation associated with the received values (process block 104), performing a split (process block 106), determining whether more splits should be performed (decision block 108), determining products of values generating by the splits (process block 110) upon determining no more splits should be performed, summing the products (process block 112), and storing the summed products as the product of the originally received values (process block 114). Bearing this in mind, each operation of the process 100 will now be discussed.

At process block 102, processor 12 (e.g., via core 22) receives two values (e.g., operands) to be multiplied. For example, the processor 12 may receive an instruction to multiply two matrices, two vectors, or a matrix and a vector that include double-precision floating-point values. In response to such a request (e.g., associated with the application 20), the one or more cores 22 of the processor 12 may receive inputs that are to be multiplied (e.g., two matrices, two vectors, or a matrix and a vector). The values (e.g., operands) to be multiplied may include double-precision floating-point values (e.g., FP64 values). More specifically, as described above, the processor 12 may decode the instruction to determine the operands that will be multiplied.

At process block 104, the processor 12 (e.g., via core 22) may determine one or more multiplication operations to be performed. More specifically, the processor 12 may determine how to perform the requested multiplication operation, for instance, by determining which of the data types provided above will be used to perform the multiplication operation. In other words, the processor 12 can determine which lower precision data type two double-precision floating-point values will be converted to in order to perform the requested multiplication operation. In some embodiments, the decoder circuitry 66 make may this determination by decoding a received instruction to perform a multiplication operation. For instance, a decoded opcode may indicate that two values (e.g., operands) are to be multiplied by one another.

In one embodiment, the floating-point data type may be user-defined. For example, a user of the system 10 may select from the data types provided in Table 1 (e.g., a data type other than FP64), and the DGEMM instruction 18 may indicate the user's selection. More specifically, the instruction to perform a multiplication operation include an operation code (opcode) to indicate the user-selected data type. Accordingly, when two double-precision floating-point values are to be multiplied, the processor 12 may determine the lower precision data type to be used based on a user-selected data type.

In other embodiments, the processor 12 may determine which lower precision data type in a different manner or consider several factors. For example, there may be a default lower precision data type defined by the DGEMM instruction 18. As another example, the processor 12 may determine which lower precision data type to use in a manner that minimizes the area of the processor 12 used to determine the product of the double-precision floating-point values, utilizes at least a threshold number of mantissa bits (e.g., provides a threshold precision). Another factor that may be considered is the number of multiplication operations that will be carried out for a particular lower precision data type. For instance, if two FP64 values were multiplied together, this may be said to involve one multiplication operation. However, when using lower precision data types, each FP64 value may be split into several lower precision values, meaning more than one multiplication operation would be performed. Additionally, a model of the processor 12 may be taken into consideration. For example, different lower precision data types may be more suitable to different models of processors based on circuitry (e.g., FPUs) included in the processor, such as the number of cores 22 and/or whether the processor includes circuitry specific for a particular data type (e.g., one or more FPUs for a particular lower precision data type). Each of these factors may be utilized alone or in combination with any of the other factors described above.

At process block 106, the processor 12 may perform a split, meaning the processor may determine a value of a lower precision data type from a value having higher precision data type (e.g., a double-precision value). For instance, in an operation in which A and B are FP64 values (e.g., operands) to be multiplied, A may be represented as several values that are less precise that FP64 values. For example, in the case of the FP38 data type, a first value $A_1$ in the FP38 format may be determined from the FP64 value ("A"). In some embodiments, the FPUs 68 may perform the split based on the coder circuitry 66 decoding instructions to perform a multiplication operation. In other words, the processor 12 converts a first portion of an operand (e.g., a FP64 value) into a lower precision data type (e.g., a FP38 value).

At decision block 108, the processor 12 may determine whether more splits should be performed. That is, the processor 12 may determine whether more values of the lower precision data type should be generated. When the processor 12 determines that more values should be generated, the processor 12 may return to generate another value. Accordingly, the processor 12 may iterate between process block 106 and decision block 108 until the processor 12 has determined that a sufficient number of values have been generated. For instance, after generating $A_1$, the processor 12 may determine that another value should be generated, and the processor 12 may generate another value (e.g., $A_2$) from the FP64 value. To determine how many splits should be performed (e.g., how many lower precision values should be used), the processor 12 may consider any factor discussed above with respect to process block 104 or any combination of these factors. The operations discussed with respect to process block 106 and process block 108 may be performed during execution of process block 84, process block 86, process block 88, or a combination thereof.

Table 2 is provided below to provide more information regarding different combinations of data types, where a combination of a data type includes the data type and the number of instances (e.g., values) of that data type that would be used (e.g., whether a FP64 value is split into 4, 5, or 7 BF16 values). More specifically, Table 2 describes the area of the processor 12 that would be used for a given combination, the number of implicit mantissa bits in that combination, and the number of multiplication operations that would be performed. Each combination is given as a data type multiplied by Y, where Y is the number of values of the data type used in a particular combination. Table 2 includes "FP64×1" (i.e., a single FP64 value) as a baseline and that the number of multiplication operations is relative to the FP64 value (e.g., a certain number of times as many multiplication operations that would be performed compared to if the FP64 value were not converted into a lower precision data type). Additionally, it should be noted that the combinations provided in Table 2 are examples of some combinations that may be used. In other words, combinations other than those listed below may be utilized.

operations involving FP64 values, less area is utilized using each of the other combinations listed in Table 2, which can be performed using Y FPUs 68 (where Y is the number of values of a lower precision data type) that can perform operations involving lower precision data types. The FPUs 68 associated with the lower precision data types are smaller than FPUs 68 associated with double-precision values because the lower precision data types include fewer bits.

The number of multiplication operations relative to FP64 can be determined using the following equation:

$$n = \frac{(Y+1)(Y)}{2} \quad \text{Equation 1}$$

where n is the number of operations relative to multiplication using FP64 values and Y is the number of lower precision data type values being used. In particular, while the number of operations performed could be $Y^2$ if each lower precision data type value were multiplied, some of the lower precision data type values that are generating when splitting an initial value (e.g., a FP64 value) may be insignificant. By not determining certain products of the lower precision data type values, the end result (i.e., a product from matrix multiplication involving FP64 values) is still accurate, and it is obtained more quickly because fewer multiplication operations are performed (relative to performing $Y^2$ operations). This is discussed in more detail below with respect to process block 110. Additionally, while more multiplication operations may be performed relative to when FP64 values are used, the processor 12 may make the multiplication operations more quickly than performing a single multiplication operation involving FP64 values because each of the multiplication operations involves fewer bits being multiplied. For instance, in some cases, multipli-

TABLE 2

Example Data Type Combinations

| Combination | Number of implicit mantissa bits in a single entry | Total number of implicit mantissa bits | Processor area (arbitrary units) | Area reduction compared to FP64 × 1 (%) | Number of multiplication operations relative to FP64 × 1 |
|---|---|---|---|---|---|
| FP64 × 1 | 53 | 53 | 2809 | 0.0 | 1 |
| BF16 × 4 | 8 | 32 | 256 | 90.9 | 10 |
| BF16 × 5 | 8 | 40 | 320 | 88.6 | 15 |
| BF16 × 7 | 8 | 56 | 448 | 84.1 | 28 |
| FP16 × 4 | 11 | 44 | 484 | 82.8 | 10 |
| FP20 × 4 | 12 | 48 | 576 | 79.5 | 10 |
| FP20 × 5 | 12 | 60 | 720 | 74.4 | 15 |
| FP25 × 3 | 14 | 42 | 588 | 79.1 | 6 |
| FP25 × 4 | 14 | 56 | 784 | 72.1 | 10 |
| FP29 × 3 | 18 | 54 | 972 | 65.4 | 6 |
| FP38 × 2 | 27 | 54 | 1458 | 48.1 | 3 |

The area of the processor 12 used to perform the multiplication operations for each combination listed in Table 2 can be estimated by the squaring the number of implicit mantissa bits for the data type being used and multiplying that number by the amount of values being used in a particular combination (e.g., for BF16×4, the area is $4*8^2$, which equals 256). As indicated in Table 2, each combination of lower precision data types results in less area of the processor 12 being used compared to a typical DGEMM operation using FP64 values. In other words, rather than using a single FPU 68 (or core 22) that can perform cation operations involving the lower precision data types may be performed 32 or 64 times more quickly than a single operation involving double-precision values. Accordingly, while using lower precision data types as described herein may result in more multiplication operations being performed, because the operations can be performed more quickly than operations involving double-precision values, the processor 12 may more quickly determine the products of double-precision values using the process 100. Moreover, in some cases, utilizing the lower precision data types may reduce the amount of power consumed by the processor 12.

Before continuing to discuss the process 100, it should be noted that several of the combinations provided in Table 2 include a higher number of total implicit mantissa bits than FP64×1. These lower precision data type combinations include BF16×7, FP20×5, FP25×4, FP29×3, and FP38×2. Thus, while the lower precision data types may be less precise, the combinations (e.g., groups of lower precision data types) that can be used to determine products involving double-precision values may actually be more precise because the combinations may have more total implicit mantissa bits than FP64×1.

Continuing with the discussion of the process 100, if at decision block 108 the processor 12 determines that no more splits are needed, at process block 110, the processor 12 may determine products of the lower precision values. More specifically, as indicated above, the processor 12 may only determine a subset of all potential products between the lower precision values. For example, consider a case in which two FP64 values A and B are respectively converted into Y lower precision data type values (e.g., BF16 values), where Y is equal to three. Thus, A is converted into values $A_1$, $A_2$, and $A_3$, and B is converted into values $B_1$, $B_2$, $B_3$. Before processing to discuss this example in more detail, it should be noted that in other cases, Y may be other positive integers (e.g., an integer between two and seven, inclusive of two and seven).

Continuing with the current example, the product of A and B (i.e., A*B) may be determined based on the following equations:

$$(A_1 + A_2 + A_3)(B_1 + B_2 + B_3) = (A_1 \times B_1) + ((A_1 \times B_2) + (A_2 \times B_1)) + ((A_1 \times B_3) + (A_2 \times B_2) + (A_3 \times B_1)) + ((A_2 \times B_3) + (A_3 \times B_2)) + (A_3 \times B_3) \quad \text{Equation 3}$$

In Equation 3, there are five "groups" of products separated by parentheses. These groups include products that share the same sum when i and j are added. For instance, a first group (including $A_1 \times B_1$) includes products in which the sum of i and j is two, a second group includes products in which the sum of i and j is three, a third group includes products in which the sum of i and j is four, a fourth group includes products in which the sum of i and j is five, and a fifth group includes products in which the sum of i and j is six. Accordingly, to determine the product of A and B, one could add together the nine products included in Equation 3. These products can be referred to as "potential" products, meaning the processor 12 could potentially determine the values of these products, and, in some embodiments, the processor 12 may determine each of the potential products at process block 110.

However, some of the products included in Equation 3 may be insignificant (e.g., too small to significantly contribute to the sum of the products of Equation 3). Indeed, the value $A_2$ will be $2^M$ times less significant than $A_1$, and $A_3$ will be $2^M$ times less significant than $A_2$, where M is the number of implicit mantissa bits in the data type being used. In the current example in which BF16 values are being used, and M is 8, as listed in Table 2. Thus, the absolute value of $A_2$ will be at least 256 times smaller than the absolute value of $A_1$, and the absolute value of $A_3$ will be at least 256 times smaller than the absolute value of $A_2$, which is at least 65532 times smaller than $A_1$. Accordingly, the values of $A_2$ and $A_3$ may be somewhat insignificant compared to the value of $A_1$. However, in some cases, when multiplied by another value (e.g., $B_1$ or $B_2$), these values may include relevant bits, while other times the bits may be irrelevant (e.g., result in a product that is insignificant when summed with other products). In other words, in the present example, in some cases, $A_2$ and $A_3$ (as well as $B_2$ and $B_3$) may be too small to significantly contribute to the FP64 multiplication product being determined.

Keeping this in mind, the processor 12 may determine product of A and B by only determining a subset of the products involving the lower precision data type values (i.e., a subset of the products of Equation 3). More specifically, the processor 12 may determine products of lower precision data type values involving the $i^{th}$ lower precision data type value generated from value A and $j^{th}$ lower precision data type value generated from value B for which the sum of i and j is less or equal to Y+1. Accordingly, in the example in which A and B are each split into three BF16 values, the products included in the first, second, and third groups discussed above (i.e., products in which the sum of i and j is two, three, or four (because Y+1 is equivalent to three plus one (i.e., 4)) may be determined by the processor 12, while the products in the fourth and fifths groups discussed above may not be calculated. In other words, the processor 12 may determine six of the nine potential products indicated in Equation 3. Accordingly, at process block 110, the processor 12 may determine the values of some of the potential products without determining the value of each the potential product that results when splitting A and B into lower precision data type values.

When determining the products of the lower precision values, the processor 12 may utilize the GEMM logic 24 (e.g., FPUs) to perform several multiplication operations in parallel. For instance, as indicated above, more multiplication operations may be performed using the lower precision data types relative to double-precision floating point data. However, each of the multiplication operations may be carried out using a different portion of the GEMM circuitry 24 (e.g., different FPUs) such that the multiplication operations, or a portion thereof, can be performed simultaneously. In other embodiments, the multiplication operations may be performed using a single portion of the GEMM circuitry 24 (e.g., a single FPU), in which case the multiplication operations would not be carried out simultaneously.

At process block 112, the processor 12 may determine the sum of the products determined at process block 110. For example, the determined products may be provided to the accumulator 32, and the processor 12 may then determine the sum of the products by adding the products to one another, for instance, using the FPUs 68. As described above, the accumulator 32 may be a FP64 accumulator. Accordingly, while values provided to the accumulator 32 may not be double-precision values, the sum determined using the values stored in the accumulator 32 may be a double-precision value when the accumulator is a double-precision floating point accumulator (e.g., a FP64 accumulator).

At process block 114, the processor 12 may return the sum determined at process block 112 as the product of the double-precision floating-point values. Accordingly, the processor 12 may determine a product of double-precision floating-point values by utilizing circuitry (e.g., FPUs) that can perform multiplication operations on data types that are less precise than double-precision values.

In some embodiments, the process 100 may include additional operations. For example, prior to determining the products of lower precision data type values as described above with respect to process block 110, the processor 12 may determine which of the potential products involving lower precision data type values will be determined. The processor 12 may make this determination in a manner generally similar to the technique described above with regard to determining which of the products indicated in Equation 3 would be calculated. For example, the processor 12 may determine the product of each combination of values resulting from splitting two double-precision values (e.g., $A_1$ and $B_1$ respectively generated from A and B) in which the sum of i and j is less than or equal to the sum of one and the number of values that each double-precision value was split into (i.e., Y+1).

As another example, in some embodiments, scaling operations may be performed. For example, when the range of a data type differs from FP64 (e.g., when the number of exponent bits in a lower precision data type is less than the number of exponent bits in an FP64 value), scaling may be performed on each input (e.g., by multiplying inputs A and B by a first and second scaling factor, respectively). In other words, a scale may be applied to two inputs that are going to be multiplied, for instance, before the two values are split into other lower precision data types. The products of involving the lower precision data types may be calculated and summed as described above, and the sum can be divided by the scaling factors that were applied to the original inputs to provide a matrix multiplication product.

Additionally, it should be noted that scaling factors may be utilized when splitting inputs (e.g., at process block 106). For example, for a FP64 value C may be split into three FP16 values $X_1$, $X_2$, and $X_3$ such that the sum of $X_1$, $X_2$, and $X_3$ equals C. Each of the values $X_1$, $X_2$, and $X_3$ may be multiplied by scaling factors $s_1$, $s_2$, $s_3$, respectively, to account for the values $X_1$, $X_2$, and $X_3$ having different ranges of magnitude (i.e., having different exponents). For instance, in some cases, lower order values (e.g., $X_3$) may be much less significant than other values due to having a lower exponent value. In some cases, the value of a lower order value may be zero due rounding. Thus, to keep the value meaningful (i.e., not equal to zero), scaling factors may be introduced. The scaling factors may be accounted for as described above. Additionally, it should be noted that while performing multiplication operations with scaling factors may increase the amount of calculations the processor 12 performs, the added amount of calculations is generally much less than the amount of calculations done to calculate the product of two values being multiplied (e.g., $X_1$ multiplied by $X_2$). For example, a matrix-matrix multiplication operation involving matrices A and B having an order n, the amount of calculations the processor 12 performs to carry out the matrix-matrix multiplication operation (i.e., A×B) may be of the order $n^3$. However, additionally calculations performed due to using scaling factors may be of the order $n^2$.

As noted above, scaling operations may be performed in certain instances, such as when the lower precision data format being utilized includes fewer exponent bits than FP64 values. Thus, to avoid using scaling, data types having the same number of exponent bits as FP64 values may be utilized. As indicated in Table 1, these include FP25, FP29, and FP38. Additionally, it should be noted that the processor 12 may take into account whether scaling would be performed when selecting a lower precision data type to use. For example, the DGEMM instructions 18 may default to allowing each lower precision data type to be used. However, there may be an adjustable setting (e.g., changeable based on a user input) to cause the processor 12 to only utilize data types that would not be scaled.

Figure 5:
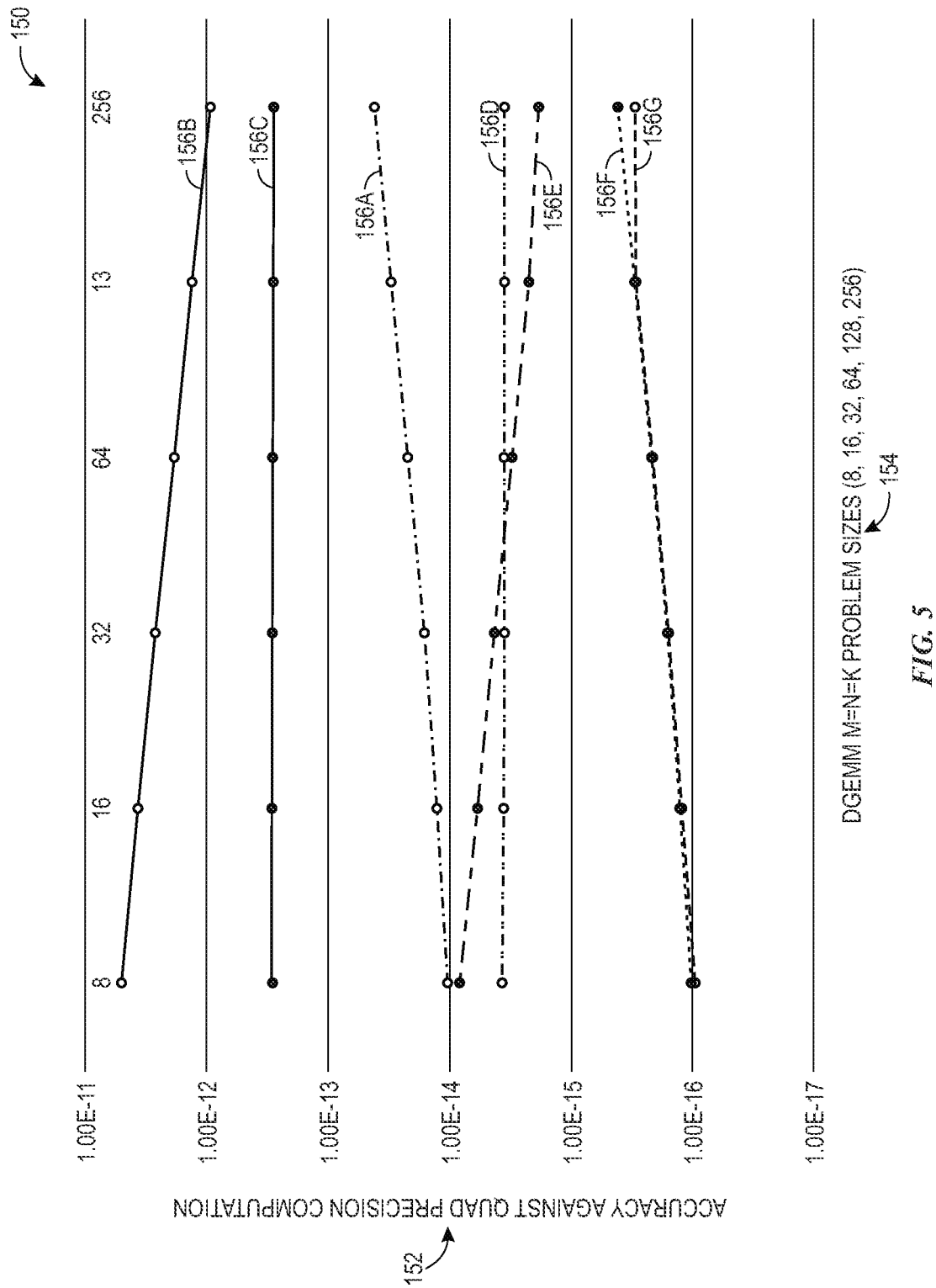
FIG. 5 is a graph showing the accuracy products determined using several data formats, in accordance with an embodiment.

While the techniques discussed herein enable matrix multiplication involving double-precision floating-point values to be performed using less area of the processor 12 and more quickly than performing multiplications using FP64 values, these techniques may also generate products that are also more accurate. To help illustrate, FIG. 5 is a graph showing the accuracy (indicated by axis 152) of several combinations (indicated by lines 156A-156G) included in Table 3 for different problem sizes (indicated by axis 154 where the problem size is indicative of how large the inputs being multiplied are (e.g., the number of values included in a matrix)). The lower in position along the axis 152, the more accurate. The further to the right along the axis 154, the larger the size of the inputs being multiplied.

The line 156A is representative of FP64×1 as determined using quadruple-precision-GEMM, line 156B is representative of BF16×4, line 156C is representative of FP25×3, line 156D is representative of FP20×4, line 156E is representative of BF16×5, line 156F is representative of FP29×3, and line 156G is representative of both FP25×4 and FP20×5. As illustrated, lines 156D-G are positioned beneath line 156A. Accordingly, in the illustrated example, FP20×4, BF16×5, FP29×3, FP25×4, and FP20×5 are more accurate than performing matrix multiplication using double-precision inputs. It should also be noted that BF16×5 and FP20×4 also include fewer total implicit mantissa bits than FP64×1 (as indicated in Table 2). Thus, while BF16×5 and FP20×4 are less precise, using BF16×5 and FP20×4 may still produce products that are more accurate than products determined using FP64×1.

Accordingly, the techniques discussed herein may enable processors to emulate performing multiplication operations (e.g., matrix-matrix, matrix-vector, and vector-vector multiplication) involving double-precision inputs (e.g., FP64 inputs) in a manner that reduces the amount of processor area utilized. The area saved using these techniques may be used to perform other calculations or operations, thereby increasing the efficiency of the processor. Additionally, because computations are performed on smaller sized pieces of data (e.g., lower precision data types), the amount of time used to determine products may also be reduced. Moreover, certain lower precision data types may produce more accurate products.

Additionally, while the techniques discussed herein generally relate to emulating multiplication involving double-precision data types, it should be noted that these techniques may be utilized to emulate multiplication involving other data types, such as data types that are more precise than FP64. For example, to emulate FP80 (which has 64 mantissa bits), the combination of BF16×8, which also has 64 mantissa bits, could be utilized.

Example Register Architecture

Figure 6:
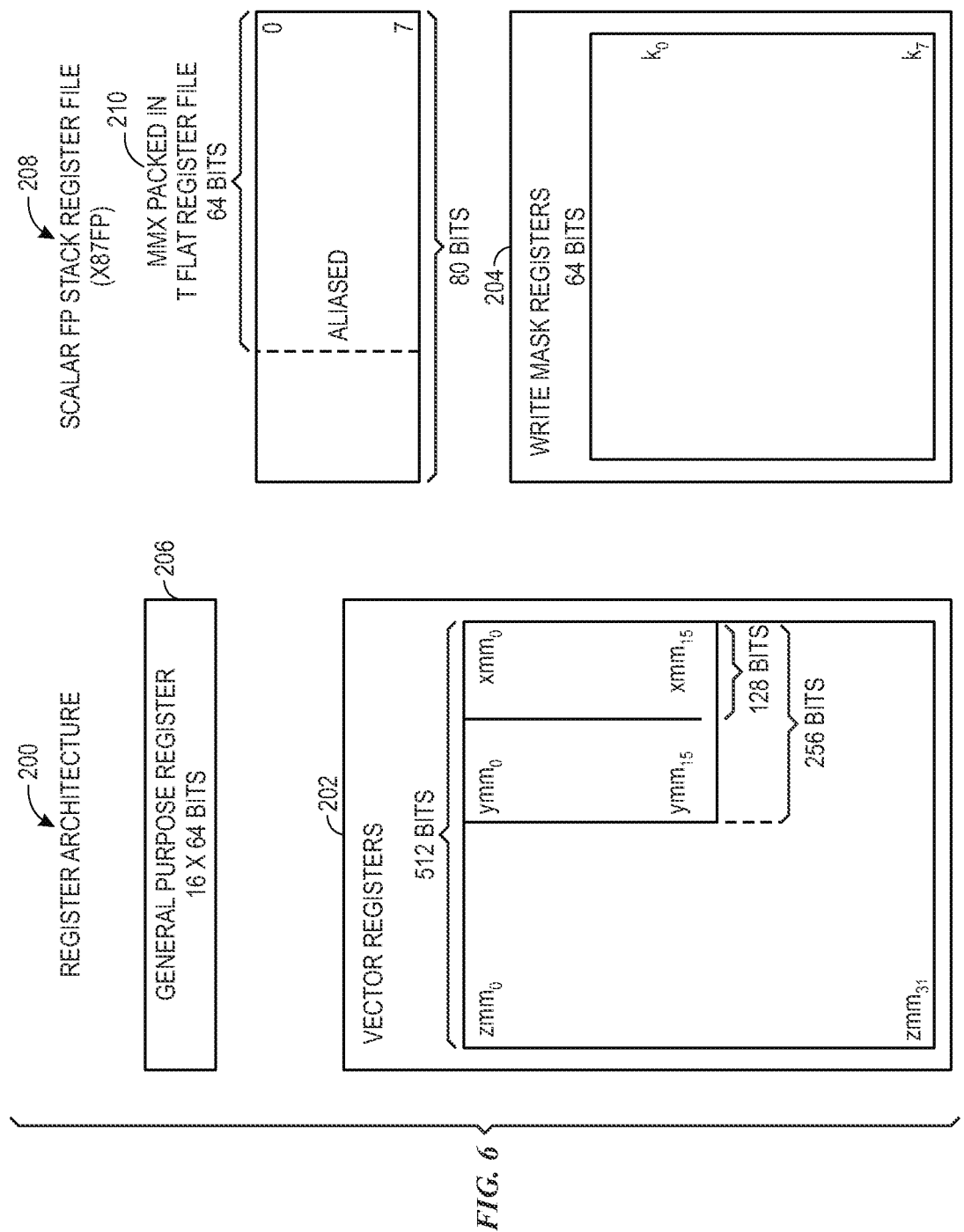
FIG. 6 is a block diagram of a register architecture, in accordance with an embodiment.

FIG. 6 is a block diagram of a register architecture 200 according to one embodiment. In the embodiment illustrated, there are 32 vector registers 202 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 204, in the embodiment illustrated, include 8 write mask registers (k0 through k7), each 64 bits in size. In an alternate embodiment, the write mask registers 204 are 16 bits in size.

General-purpose registers 206, in the embodiment illustrated, include sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 208, on which is aliased the MMX packed integer flat register file 210, in the embodiment illustrated, is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Example Core Architectures

Figure 7:
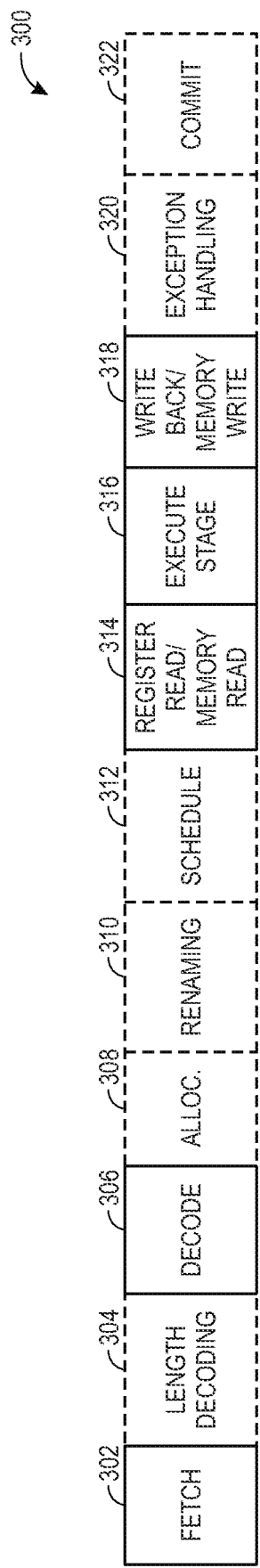
FIG. 7 is a block diagram illustrating both an example in-order pipeline and an example register renaming, out-of-order issue/execution pipeline, in accordance with an embodiment.
Figure 8:
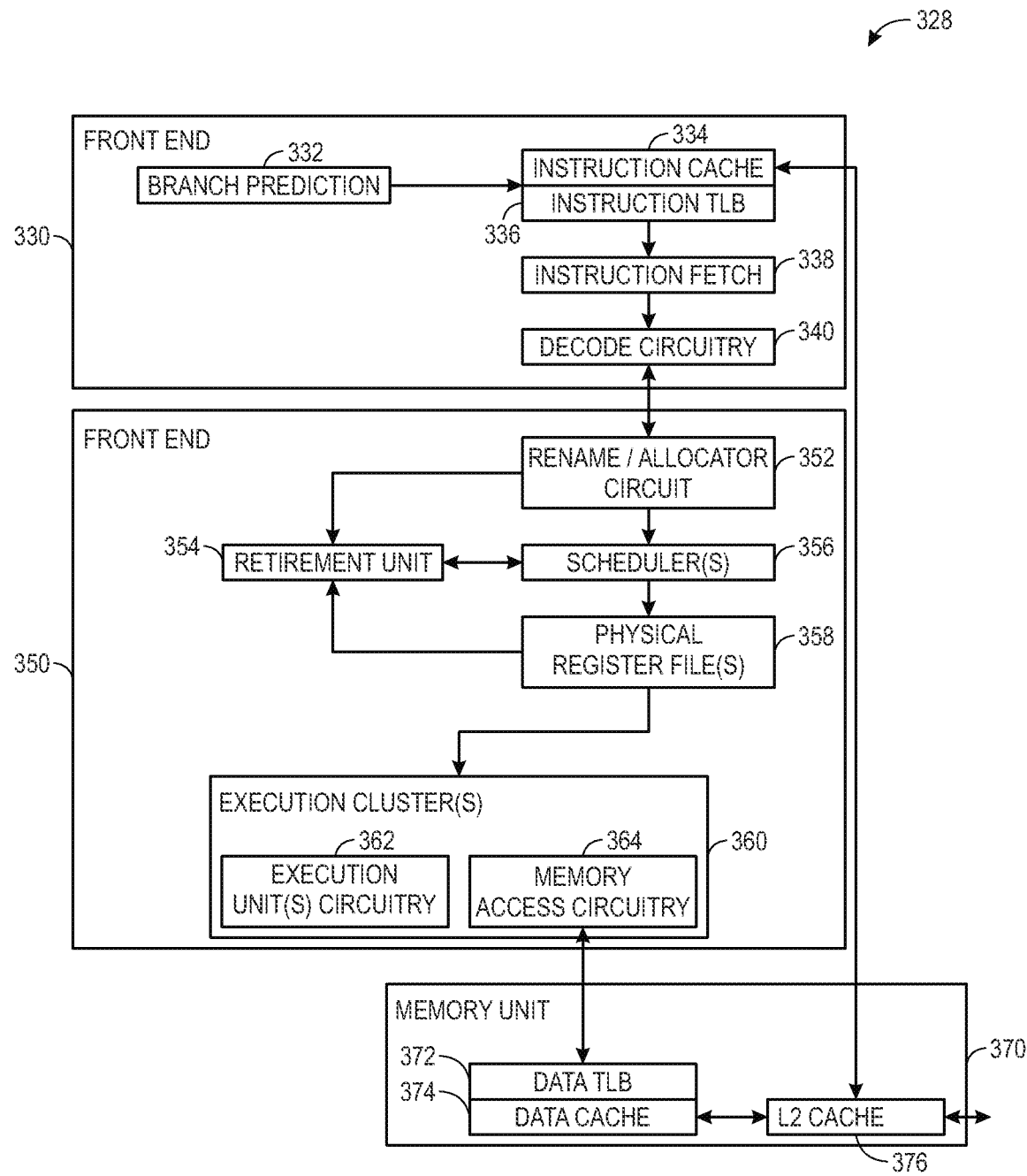
FIG. 8 is a block diagram illustrating both an example embodiment of an in-order architecture core and an example register renaming, out-of-order issue/execution architecture core to be included in a processor, in accordance with an embodiment.

FIG. 7 is a block diagram illustrating both an example in-order pipeline and an example register renaming, out-of-order issue/execution pipeline according to certain embodiments. FIG. 8 is a block diagram illustrating both an example embodiment of an in-order architecture core and an example register renaming, out-of-order issue/execution architecture core to be included in a processor according to certain embodiments. The solid lined boxes in FIG. 7 and FIG. 8 illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7, a processor pipeline 300 includes a fetch stage 302, a length decode stage 304, a decode stage 306, an allocation stage 308, a renaming stage 310, a scheduling (also known as a dispatch or issue) stage 312, a register read/memory read stage 314, an execute stage 316, a write back/memory write stage 318, an exception handling stage 320, and a commit stage 322.

FIG. 8 shows processor core 328 including a front end unit 330 coupled to an execution engine unit 350, and both are coupled to a memory unit 370. The core 328 may be a reduced instruction set computing (RISC) core, a complex instruction set computing (CISC) core, a very long instruction word (VLIW) core, or a hybrid or alternative core type. As yet another option, the core 328 may be a special-purpose core, such as, for example, a network or communication core, compression engine, coprocessor core, general purpose computing graphics processing unit (GPGPU) core, graphics core, or the like.

The front end unit 330 includes a branch prediction unit 332 coupled to an instruction cache unit 334, which is coupled to an instruction translation lookaside buffer (TLB) 336, which is coupled to an instruction fetch unit 338, which is coupled to a decode unit 340. The decode unit 340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 328 includes a microcode ROM or other medium that stores microcode for certain macroinstructions (e.g., in decode unit 340 or otherwise within the front end unit 330). The decode unit 340 is coupled to a rename/allocator unit 352 in the execution engine unit 350.

The execution engine unit 350 includes the rename/allocator unit 352 coupled to a retirement unit 354 and a set of one or more scheduler unit(s) 356. The scheduler unit(s) 356 represents any number of different schedulers, including reservations stations, central instruction window, etc. The scheduler unit(s) 356 is coupled to the physical register file(s) unit(s) 358. Each of the physical register file(s) units 358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 358 comprises a vector registers unit, a write mask registers unit, and a scalar registers unit. These register units may provide architectural vector registers, vector mask registers, and general purpose registers. The physical register file(s) unit(s) 358 is overlapped by the retirement unit 354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 354 and the physical register file(s) unit(s) 358 are coupled to the execution cluster(s) 360. The execution cluster(s) 360 includes a set of one or more execution units 362 and a set of one or more memory access units 364. The execution units 362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 356, physical register file(s) unit(s) 358, and execution cluster(s) 360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 364). It should also be understood that where separate pipelines are used, one or more of these pipelines may be out-of-order issue/execution and the rest in-order.

The set of memory access units 364 is coupled to the memory unit 370, which includes a data TLB unit 372 coupled to a data cache unit 374 coupled to a level 2 (L2) cache unit 376. In one example embodiment, the memory access units 364 may include a load unit, a store address unit, and a store data unit, each of which is coupled to the data TLB unit 372 in the memory unit 370. The instruction cache unit 334 is further coupled to a level 2 (L2) cache unit 376 in the memory unit 370. The L2 cache unit 376 is coupled to one or more other levels of cache and eventually to a main memory.

By way of example, the example register renaming, out-of-order issue/execution core architecture may implement the pipeline 300 as follows: 1) the instruction fetch 338 performs the fetch and length decoding stages 302 and 304; 2) the decode unit 340 performs the decode stage 306; 3) the rename/allocator unit 352 performs the allocation stage 308 and renaming stage 310; 4) the scheduler unit(s) 356 performs the schedule stage 312; 5) the physical register file(s) unit(s) 358 and the memory unit 370 perform the register read/memory read stage 314; the execution cluster 360 perform the execute stage 316; 6) the memory unit 370 and the physical register file(s) unit(s) 358 perform the write back/memory write stage 318; 7) various units may be involved in the exception handling stage 322; and 8) the retirement unit 354 and the physical register file(s) unit(s) 358 perform the commit stage 324.

The core 328 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 328 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 334/374 and a shared L2 cache unit 376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Example of In-Order Core Architecture

Figure 9A:
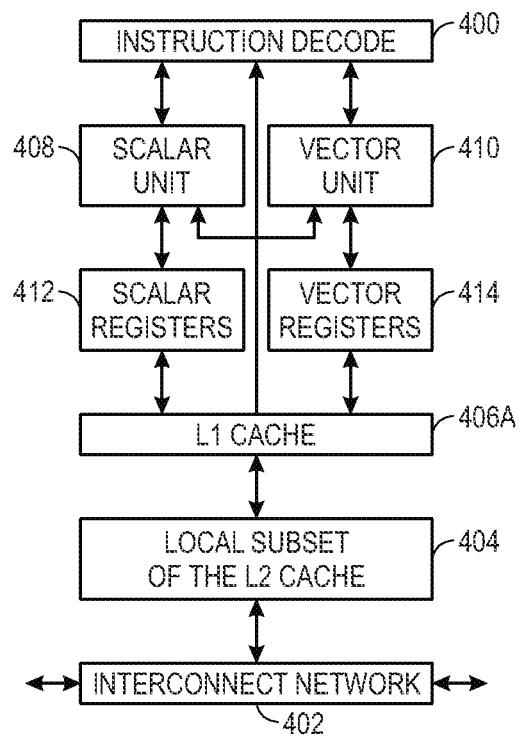
FIG. 9A and FIG. 9B illustrate a block diagram of a more specific example in-order core architecture, which core would be one of several logic blocks (including other cores of the same type and/or different types) in a chip, in accordance with an embodiment.
Figure 9B:
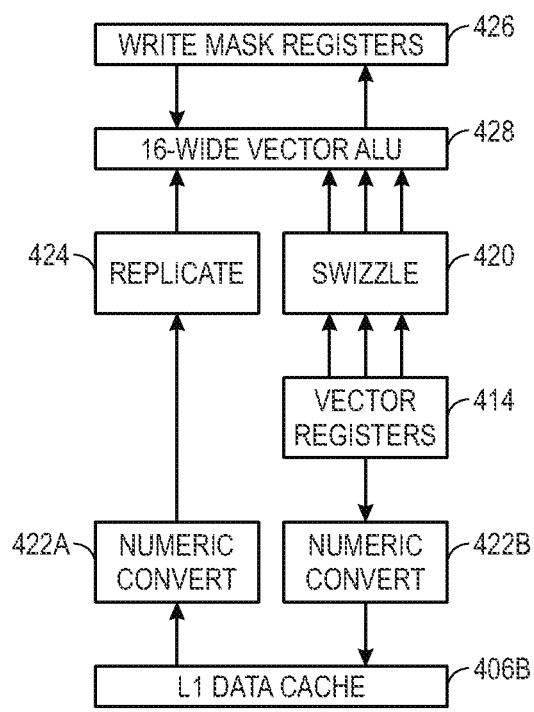

FIG. 9A and FIG. 9B illustrate a block diagram of a more specific example in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 402 and with its local subset of the Level 2 (L2) cache 404, according to certain embodiments. In one embodiment, an instruction decoder 400 supports the x86 instruction set with a packed data instruction set extension. An L1 cache 406A allows low-latency accesses to cache memory into the scalar and vector units. While in one embodiment (to simplify the design), a scalar unit 408 and a vector unit 410 use separate register sets (respectively, scalar registers 412 and vector registers 414) and data transferred between them is written to memory and then read back in from a level 1 (L1) cache 406A, alternative embodiments may use a different approach (e.g., use a single register set or include a communication path that allow data to be transferred between the two register files without being written and read back).

The local subset of the L2 cache 404 is part of a global L2 cache that is divided into separate local subsets, one per processor core. Each processor core has a direct access path to its own local subset of the L2 cache 404. Data read by a processor core is stored in its L2 cache subset 404 and can be accessed quickly, in parallel with other processor cores accessing their own local L2 cache subsets. Data written by a processor core is stored in its own L2 cache subset 404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to certain embodiments. FIG. 9B includes an L1 data cache 406B part of the L1 cache 404, as well as more detail regarding the vector unit 410 and the vector registers 414. Specifically, the vector unit 410 is a 16-wide vector processing unit (VPU) (see the 16-wide ALU 428), which executes one or more of integer, single-precision float, and double-precision float instructions. The VPU supports swizzling the register inputs with swizzle unit 420, numeric conversion with numeric convert units 422A-B, and replication with replication unit 424 on the memory input. Write mask registers 426 allow predicating resulting vector writes.

Figure 10:
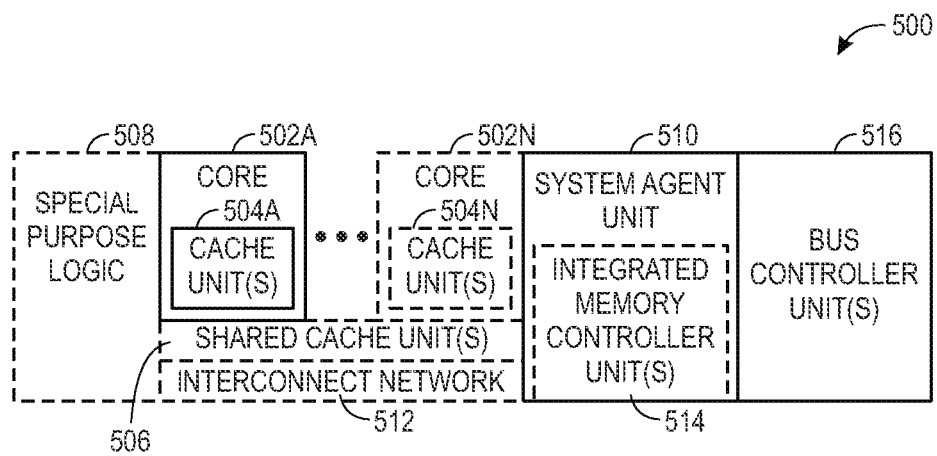
FIG. 10 is a block diagram of a processor that may have more than one core, may have an integrated memory controller, and may have integrated graphics, in accordance with an embodiment.

FIG. 10 is a block diagram of a processor 500 that may have more than one core, may have an integrated memory controller, and may have integrated graphics according to certain embodiments. The solid lined boxes in FIG. 10 illustrate a processor 500 with a single core 502A, a system agent 510, a set of one or more bus controller units 516, while the optional addition of the dashed lined boxes illustrates an alternative processor 500 with multiple cores 502A-502N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-502N being one or more general purpose cores (e.g., general purpose in-order cores, general purpose out-of-order cores, a combination of the two); 2) a coprocessor with the cores 502A-502N being a large number of special purpose cores intended primarily for graphics and/or scientific (throughput); and 3) a coprocessor with the cores 502A-502N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508 (integrated graphics logic 508 is an example of and is also referred to herein as special purpose logic), the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502A-502N.

In some embodiments, one or more of the cores 502A-502N are capable of multi-threading. The system agent 510 includes those components coordinating and operating cores 502A-502N. The system agent unit 510 may include for example a power control unit (PCU) and a display unit. The PCU may be or include logic and components needed for regulating the power state of the cores 502A-502N and the integrated graphics logic 508. The display unit is for driving one or more externally connected displays.

The cores 502A-502N may be homogenous or heterogeneous in terms of architecture instruction set; that is, two or more of the cores 502A-502N may be capable of execution the same instruction set, while others may be capable of executing only a subset of that instruction set or a different instruction set.

Example Computer Architectures

FIGS. 10-13 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
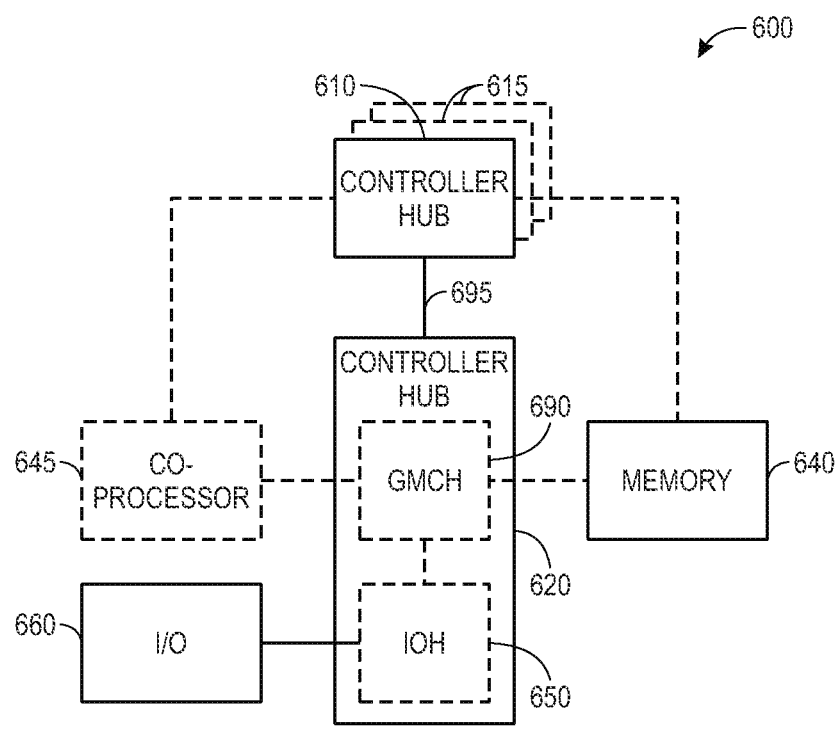
FIG. 11 is a block diagram of a system in accordance with an embodiment.

Referring now to FIG. 11, shown is a block diagram of a system 600 in accordance with one embodiment. The system 600 may include one or more processors 610, 615, which are coupled to a controller hub 620. In one embodiment the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 11 with broken lines. Each processor 610, 615 may include one or more of the processing cores described herein and may be some version of the processor 12 or the processor 500 (which may also be some version of the processor 12).

The memory 640 may be, for example, dynamic random access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645.

Coprocessor(s) 645 accept and execute the received coprocessor instructions.

Figure 12:
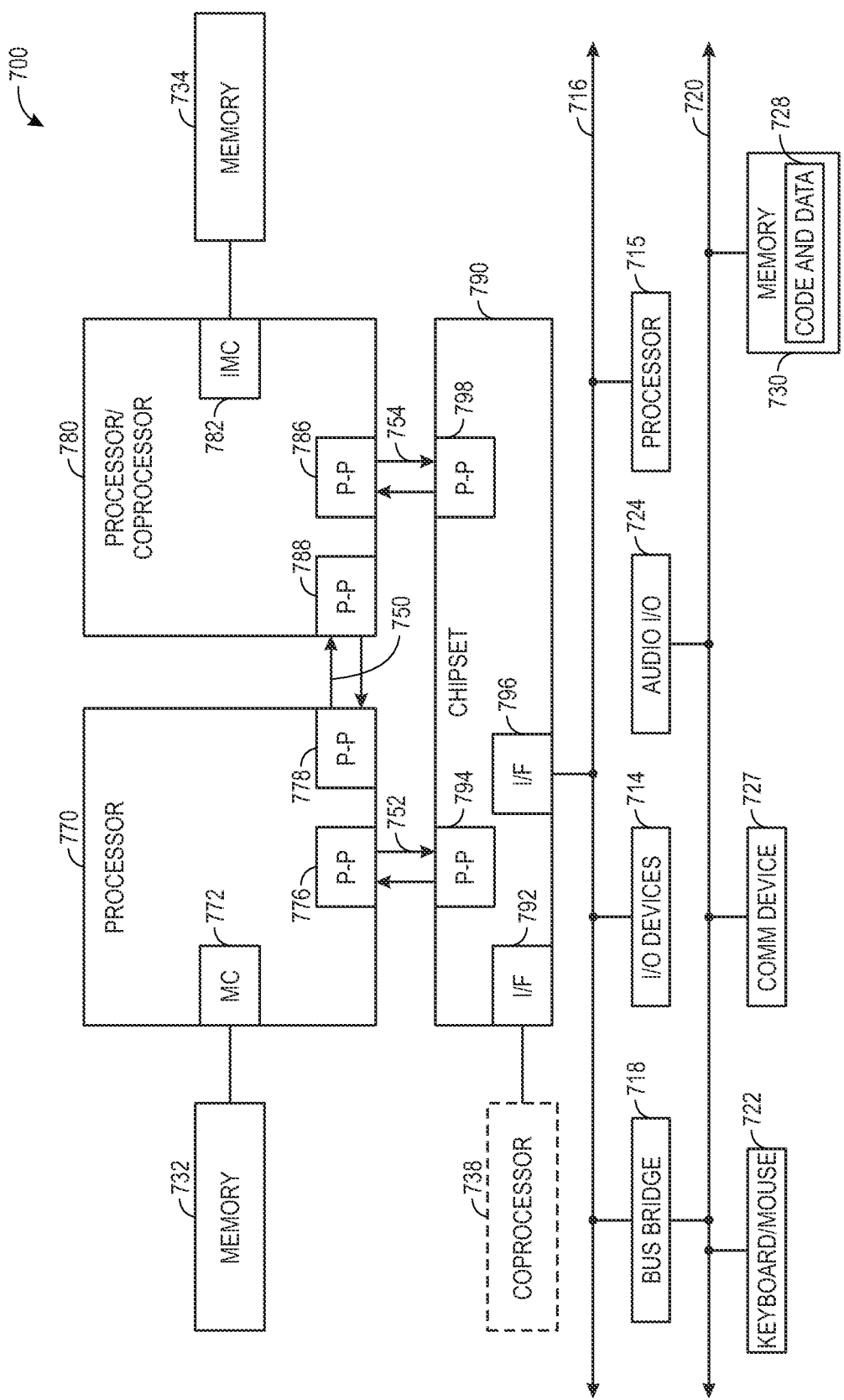
FIG. 12 is a block diagram of a first more specific example system in accordance with an embodiment.

Referring now to FIG. 12, shown is a block diagram of a first more specific example system 700 in accordance with an embodiment. As shown in FIG. 12, multiprocessor system 700 is a point-to-point interconnect system, and includes a first processor 770 and a second processor 780 coupled via a point-to-point interconnect 750. Each of processors 770 and 780 may be some version of the processor 12 or processor 500. In one embodiment, processors 770 and 780 are respectively processors 610 and 615, while coprocessor 738 is coprocessor 645. In another embodiment, processors 770 and 780 are respectively processor 610 coprocessor 645.

Processors 770 and 780 are shown including integrated memory controller (IMC) units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 12, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 12, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 12, a system may implement a multi-drop bus or other such architecture.

Figure 13:
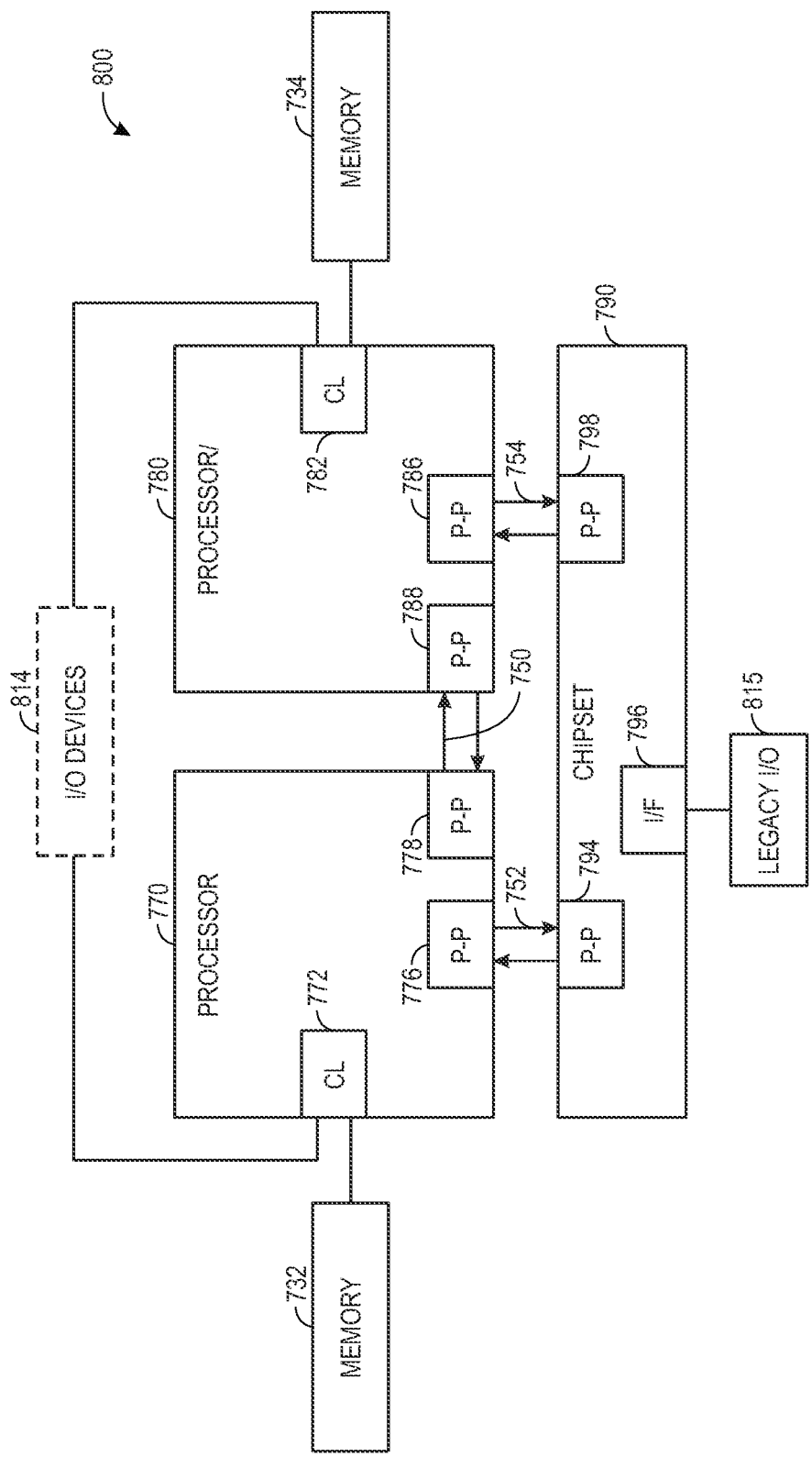
FIG. 13 is a block diagram of a second more specific example system in accordance with an embodiment.

Referring now to FIG. 13, shown is a block diagram of a second more specific example system 800 in accordance with an embodiment. Like elements in FIG. 12 and FIG. 13 bear like reference numerals, and certain aspects of FIG. 12 have been omitted from FIG. 13 in order to avoid obscuring other aspects of FIG. 13.

FIG. 13 illustrates that the processors 770, 780 may include integrated memory and I/O control logic ("CL") 772 and 782, respectively. Thus, the CL 772, 782 include integrated memory controller units and include I/O control logic. FIG. 13 illustrates that not only are the memories 732, 734 coupled to the CL 772, 782, but also that I/O devices 814 are also coupled to the control logic 772, 782. Legacy I/O devices 815 are coupled to the chipset 790.

Figure 14:
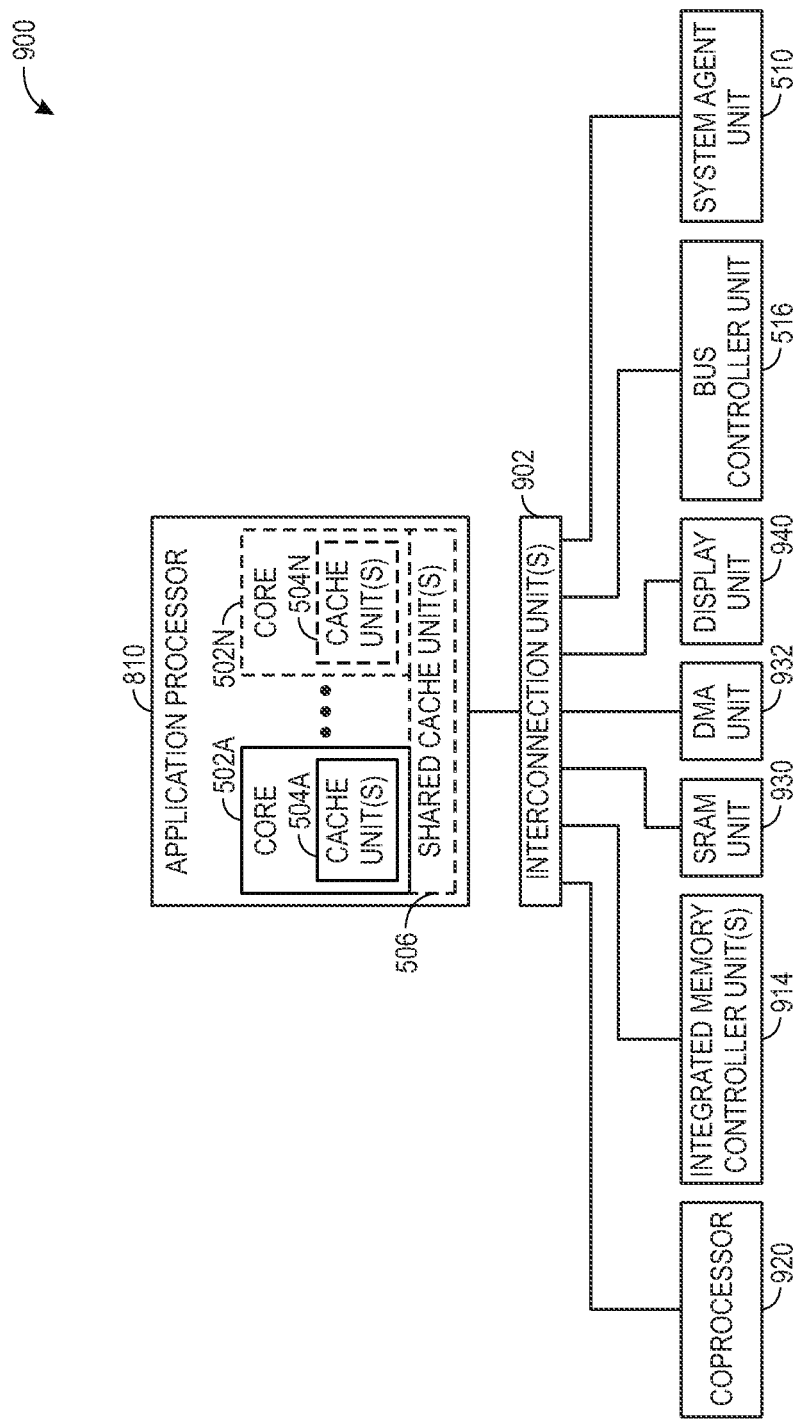
FIG. 14 is a block diagram of a SoC in accordance with an embodiment.

Referring now to FIG. 14, shown is a block diagram of a SoC 900 in accordance with an embodiment. Similar elements in FIG. 14 bear like reference numerals. Also, dashed lined boxes are optional features on more advanced SoCs. In FIG. 14, an interconnect unit(s) 902 is coupled to: an application processor 910 which includes a set of one or more cores 502A-502N, which include cache units 504A-504N, and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; an static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and/or at least one output device.

Program code, such as code 730 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments may also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
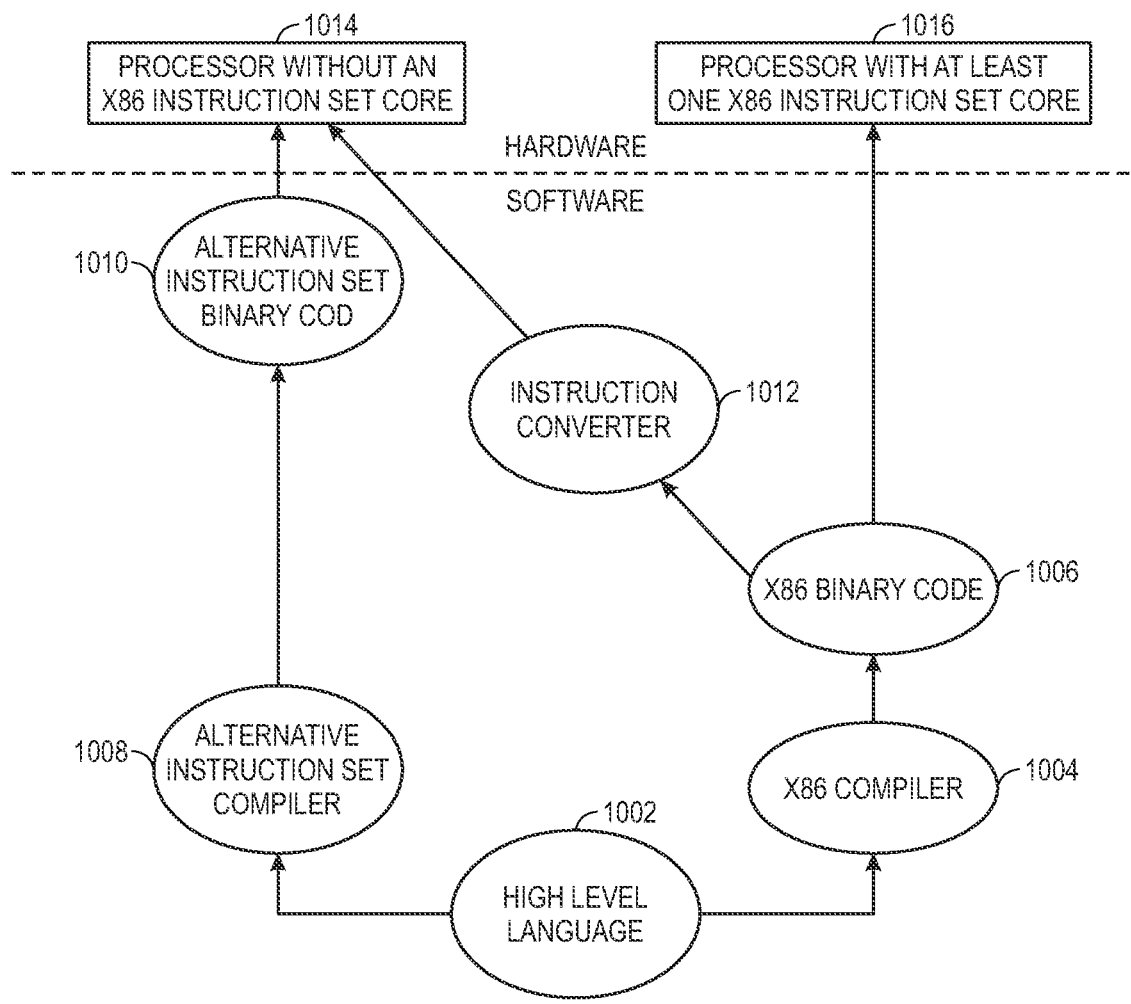
FIG. 15 is a block diagram contrasting the use of a software instruction converter to convert binary instructions in a source instruction set to binary instructions in a target instruction set, in accordance with an embodiment.

FIG. 15 is a block diagram contrasting the use of a software instruction converter to convert binary instructions in a source instruction set to binary instructions in a target instruction set according to certain embodiments. In the illustrated embodiment, the instruction converter is a software instruction converter, although alternatively the instruction converter may be implemented in software, firmware, hardware, or various combinations thereof. FIG. 15 shows a program in a high level language 1002 may be compiled using an x86 compiler 1004 to generate x86 binary code 1006 that may be natively executed by a processor with at least one x86 instruction set core 1016. The processor with at least one x86 instruction set core 1016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1004 represents a compiler that is operable to generate x86 binary code 1006 (e.g., object code) that can, with or without additional linkage processing, be executed on the processor with at least one x86 instruction set core 1016. Similarly, FIG. 15 shows the program in the high level language 1002 may be compiled using an alternative instruction set compiler 1008 to generate alternative instruction set binary code 1010 that may be natively executed by a processor without at least one x86 instruction set core 1014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1012 is used to convert the x86 binary code 1006 into code that may be natively executed by the processor without an x86 instruction set core 1014. This converted code is not likely to be the same as the alternative instruction set binary code 1010 because an instruction converter capable of this is difficult to make; however, the converted code will accomplish the general operation and be made up of instructions from the alternative instruction set. Thus, the instruction converter 1012 represents software, firmware, hardware, or a combination thereof that, through emulation, simulation or any other process, allows a processor or other electronic device that does not have an x86 instruction set processor or core to execute the x86 binary code 1006.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . ." or "step for [perform]ing [a function]. . .," it is intended that such elements are to be interpreted under 35 U.S.C. 112(f). For any claims containing elements designated in any other manner, however, it is intended that such elements are not to be interpreted under 35 U.S.C. 112(f).

Example Embodiments of the Disclosure

The following numbered clauses define certain example embodiments of the present disclosure.
CLAUSE 1.
An apparatus, comprising:

decoding circuitry to decode a single instruction, the single instruction to include an identifier of a first source operand, an identifier of a second source operand, an identifier of a destination, and an opcode to indicate execution circuitry is to multiply from the identified first source operand and the identified second source operand and store a result in the identified destination; and execution circuitry to execute the single decoded instruction to calculate a dot product by:
calculating a plurality of products using data elements of the identified first and second operands using values less precise than the identified first and second source operands;
summing the calculated products; and
storing the summed products in the destination.

CLAUSE 2.
The apparatus of clause 1, wherein the first and second source operands are matrices.
CLAUSE 3.
The apparatus of clause 1, wherein the values less precise than the identified first and second source operands are to be generated by converting at least one of the first and second source operands into a plurality of lower precision values, wherein each value of the plurality of lower precision values includes fewer mantissa bits than the first or second source operands.
CLAUSE 4.
The apparatus of clause 3, wherein the apparatus comprises a double-precision accumulator to receive at least a portion of the plurality of products before the plurality of products are summed.
CLAUSE 5.
The apparatus of clause 3, wherein the generation of the less precise values is to be performed during retrieval of the first and second source operands or during execution or the single decoded instruction to multiply the first and second source operands.
CLAUSE 6.
The apparatus of clause 1, wherein the apparatus comprises a processor, processor core, or system on a chip.
CLAUSE 7.
The apparatus of clause 1, wherein each value of the less precise values comprises fewer exponent bits that the stored values of the first source operand and the second source operand.
CLAUSE 8.
The apparatus of claim 1, wherein:
the data values of the identified first source operand comprise a first number of implicit mantissa bits;
each value of the less precise values comprises a second number of implicit mantissa bits that is less than the first number of implicit mantissa bits; and
the less precise values comprise a total number of implicit mantissa bits that is greater than the first number of implicit mantissa bits.
CLAUSE 9.
The apparatus of clause 1, wherein:
the execution circuitry comprises a floating-point unit configured to determine the product of the first and second operands without using the first and second pluralities of values; and
the execution circuitry is to determine the product of the first and second operands without using the floating-point unit.
CLAUSE 10.

A non-transitory, computer-readable medium comprising instructions that, when executed, are configured to cause a processor to:
  decode, via decoding circuitry of the processor, a single instruction, wherein the single instruction comprises:
    an identifier of a first source operand;
    an identifier of a second source operand;
    an identifier of a destination; and
    an opcode to indicate execution circuitry is to multiply from the identified first source operand and the identified second source operand and store a result in the identified destination; and
  execute, via execution circuitry of the processor, the single decoded instruction to calculate a dot product by:
    calculating a plurality of products using data elements of the identified first and second operands using values less precise than the identified first and second source operands;
    summing the calculated products; and
    storing the summed products in the destination.

CLAUSE 11.

The non-transitory, computer-readable medium of clause 10, wherein the instructions, when executed, are configured to cause the processor to:
  determine a floating-point data format that is less precise than double-precision; and generate the values less precise than the identified first and second source operands by converting the first source operand into two or more values in the floating-point data format.

CLAUSE 12.

The non-transitory, computer-readable medium of clause 11, wherein the processor is configured to select the floating-point data format from a plurality of floating-point data formats based on:
  an amount of area of the processor associated with performing multiplication operations using a particular floating-point data format;
  a number of multiplication operations associated with the particular floating-point data format; or
  both.

CLAUSE 13.

The non-transitory, computer-readable medium of clause 11, wherein the floating-point data format comprises a user-selected data format.

CLAUSE 14.

The non-transitory computer-readable medium of clause 11, wherein:
  the floating-point data format comprises a first number of exponent bits;
  the first source operand comprises a second number of exponent bits; and
  the first number of exponent bits is less than the first number of exponent bits.

CLAUSE 15.

The non-transitory, computer-readable medium of clause 11, wherein the instructions, when executed, are configured to cause the processor to determine the dot product of the first and second source operands using the two or more values in the float-point format using one or more execution units of the processor that are configured to perform multiplication operations involving the floating-point data format.

CLAUSE 16.

16. The non-transitory, computer-readable medium of clause 15, wherein:
  the processor comprises a plurality of execution units;
  the plurality of execution units comprises a first portion of the plurality of execution units and a second portion of the plurality of execution units;
  the first portion of the plurality of execution units is configured to determine the product of the two or more values in the floating-point format;
  the second portion of the plurality of execution units is configured to determine the product of the first and second inputs by multiplying the first and second source operands;
  the first portion of the plurality of execution units comprise a first area of the processor;
  the second portion of the plurality of execution units comprises a second area of the processor; and
  the first area is smaller than the second area.

CLAUSE 17.

A processor-implemented method, comprising:
  decoding, via decoding circuitry of a processor, a single instruction, wherein the single instruction comprises:
    an identifier of a first source operand;
    an identifier of a second source operand;
    an identifier of a destination; and
    an opcode to indicate execution circuitry is to multiply from the identified first source operand and the identified second source operand and store a result in the identified destination; and
  executing, via execution circuitry of the processor, the single decoded instruction to calculate a dot product by:
    calculating a plurality of products using data elements of the identified first and second operands using values less precise than the identified first and second source operands;
    summing the calculated products; and
    storing the summed products in the destination.

CLAUSE 18.

The processor-implemented method of clause 17, comprising:
  determining, via the processor, a data type having a smaller number of mantissa bits than the first source operand;
  determining, via the processor, a number of instances of the data type; and
  generating, via the processor, a first plurality of values by converting the first source operand into a number of values having the data type, wherein the number of values is equal to the number of instances.

CLAUSE 19.

The processor-implemented method of clause 18, wherein the data type comprises a first number of exponent bits that is less than or equal to a second number of exponent bits included in the first source operand.

CLAUSE 20.

The processor-implemented method of clause 17, wherein the first and second source operands comprise one or more matrices or vectors.

What is claimed is:

1. An apparatus comprising:
  decoding circuitry to decode a single instruction, the single instruction comprising:
    an identifier of a first source operand, the first source operand comprising at least one first value having a first precision;
    an identifier of a second source operand, the second source operand comprising at least one second value having a second precision;
    an identifier of a destination; and an opcode to indicate execution circuitry is to multiply from the first source operand and the second source operand and store a result in the destination; and execution circuitry to execute the single decoded instruction to calculate a dot product of the first source operand and the second source operand by:

calculating a plurality of products by:

converting the at least one first value into a first plurality of values, wherein each value of the first plurality of values has a third precision that is less precise than the first precision;

converting the at least one second value into a second plurality of values, wherein each value of the second plurality of values has a fourth precision that is less precise than the second precision; and multiplying respective values of the first plurality of values by respective values of the second plurality of values;

summing the calculated plurality of products to generate summed products; and storing the summed products in the destination.

2. The apparatus of claim 1, wherein the first and second source operands are matrices.

3. The apparatus of claim 1, wherein the first precision and the second precision are equal.

4. The apparatus of claim 3, wherein the at least one first value and the at least one second value are double-precision floating-point values.

5. The apparatus of claim 1, wherein multiplying respective values of the first plurality of values by respective values of the second plurality of values comprises multiplying the respective values of the first plurality of values by the respective values of the second plurality of values using multiplier circuitry that is only configured to multiply values having precisions less precise than the first precision.

6. The apparatus of claim 1, wherein apparatus comprises a processor, a processor core, or a system on a chip.

7. The apparatus of claim 1, wherein each value of the first plurality of values comprises fewer exponent bits than the at least one first value.

8. The apparatus of claim 1, wherein:

the first plurality of values comprises a first set of three values;

the second plurality of values comprises a second set of three values; and the execution circuitry is to calculate the plurality of products by multiplying at least one value of the first set of three values by fewer than all values of the second set of three values.

9. The apparatus of claim 1, wherein:

the execution circuitry comprises a floating-point unit configured to multiply the at least one first value by the at least one second value; and the execution circuitry is to calculate the dot product without using the floating-point unit.

10. A non-transitory, computer-readable medium comprising instructions that, when executed, are configured to cause a processor to:

decode, via decoding circuitry of the processor, a single instruction, wherein the single instruction comprises:

an identifier of a first source operand, the first source operand comprising at least one first value having a first floating-point data format with a first precision;

an identifier of a second source operand, the second source operand comprising at least one second value having a second floating-point data format with a second precision;

an identifier of a destination; and an opcode to indicate execution circuitry is to multiply from the first source operand and the second source operand and store a result in the destination; and execute, via execution circuitry of the processor, the single decoded instruction to calculate a dot product of the first source operand and the second source operand by:

calculating a plurality of products by:

converting the at least one first value into a first plurality of values, wherein each value of the first plurality of values has a third floating-point data format with a third precision that is less precise than the first precision;

converting the at least one second value into a second plurality of values, wherein each value of the second plurality of values has a fourth floating-point data format with a fourth precision that is less precise than the second precision; and multiplying respective values of the first plurality of values by respective values of the second plurality of values;

summing the calculated plurality of products to generate summed products; and storing the summed products in the destination.

11. The non-transitory, computer-readable medium of claim 10, wherein:

the second floating-point data format is the first floating-point data format; and the fourth floating-point data format is the third floating-point data format.

12. The non-transitory, computer-readable medium of claim 11, wherein the processor is configured to select the third floating-point data format from a plurality of floating-point data formats based on:

an amount of area of the processor associated with performing multiplication operations using a particular floating-point data format;

a number of multiplication operations associated with the particular floating-point data format; or both.

13. The non-transitory, computer-readable medium of claim 11, wherein the third floating-point data format is a user-selected data format.

14. The non-transitory computer-readable medium of claim 11, wherein the third floating-point data format is bfloat16 floating-point format or a half-precision floating-point data format.

15. The non-transitory, computer-readable medium of claim 11, wherein:

a third value included in the at least one first value comprises a first number of implicit mantissa bits;

the first plurality of values comprises at least two values having the third floating-point data format generated by converting the third value into the at least two values; and the at least two values comprise a total number of implicit mantissa bits that is greater than the first number of implicit mantissa bits.

16. The non-transitory, computer-readable medium of claim 11, wherein:

the second floating-point data format differs from the first floating-point data format;

the fourth floating-point data format differs from the third floating-point data format; or both.

17. A processor-implemented method, comprising:

decoding, via decoding circuitry of a processor, a single instruction, wherein the single instruction comprises:

an identifier of a first source operand, the first source operand comprising at least one first value having a first floating-point data format with a first precision;

an identifier of a second source operand, the second source operand comprising at least one second value having a second floating-point data format with a second precision;

an identifier of a destination; and an opcode to indicate execution circuitry is to multiply from the first source operand and the second source operand and store a result in the destination; and executing, via execution circuitry of the processor, the single decoded instruction to calculate a dot product of the first source operand and the second source operand by:

calculating a plurality of products by:

converting the at least one first value into a first plurality of values, wherein each value of the first plurality of values has a third floating-point data format with a third precision that is less precise than the first precision;

converting the at least one second value into a second plurality of values, wherein each value of the second plurality of values has a fourth floating-point data format with a fourth precision that is less precise than the second precision; and multiplying respective values of the first plurality of values by respective values of the second plurality of values;

summing the calculated plurality of products to generate summed products; and storing the summed products in the destination.

18. The processor-implemented method of claim 17, wherein the first plurality of values comprises at least three values.

19. The processor-implemented method of claim 17, wherein the third floating-point data format comprises a first number of exponent bits that is less than or equal to a second number of exponent bits included in the first floating-point data format.

20. The processor-implemented method of claim 17, wherein the first and second source operands comprise one or more matrices or vectors.

* * * * *